(12) United States Patent
Becker

(10) Patent No.: US 7,793,822 B2
(45) Date of Patent: Sep. 14, 2010

(54) DIRECT MAILING DEVICE

(76) Inventor: Thomas Becker, 10828 Chaucer Dr., Willow Springs, IL (US) 60480

( * ) Notice: Subject to any disclaimer, the term of this patent is extended or adjusted under 35 U.S.C. 154(b) by 1281 days.

(21) Appl. No.: 11/250,311

(22) Filed: Oct. 14, 2005

(65) Prior Publication Data
US 2006/0036492 A1 Feb. 16, 2006

Related U.S. Application Data

(63) Continuation-in-part of application No. 10/865,358, filed on Jun. 9, 2004, now abandoned.

(51) Int. Cl.
*B65D 27/06* (2006.01)
*B42D 15/00* (2006.01)
(52) U.S. Cl. ..................... 229/300; 229/92.8
(58) Field of Classification Search ............... 223/92.8, 223/300; 229/92.1, 92.8, 300
See application file for complete search history.

(56) References Cited

U.S. PATENT DOCUMENTS

| | | | | | |
|---|---|---|---|---|---|
| 1,434,009 | A | * | 10/1922 | Harris | 229/92.8 |
| 2,363,472 | A | * | 11/1944 | Ritter | 229/92.8 |
| 2,805,816 | A | * | 9/1957 | Morgan | 229/92.8 |
| 3,229,893 | A | * | 1/1966 | Stein | 229/301 |
| 3,520,560 | A | * | 7/1970 | Isaac | 283/56 |
| D240,222 | S | * | 6/1976 | Cuozzo | D19/6 |
| 3,986,283 | A | * | 10/1976 | Pelaez | 229/92.8 |
| 4,201,332 | A | * | 5/1980 | Wooten | 229/92 |
| 4,506,823 | A | * | 3/1985 | Buchler | 229/92.8 |
| 4,541,340 | A | * | 9/1985 | Peart et al. | 101/470 |
| 4,892,246 | A | * | 1/1990 | Norman | 229/92.8 |
| 5,255,456 | A | * | 10/1993 | Franklin | 229/92.8 |
| 6,030,274 | A | * | 2/2000 | Kaplan | 229/92.8 |
| 6,472,044 | B1 | * | 10/2002 | Vichinsky et al. | 428/121 |
| 6,499,654 | B1 | * | 12/2002 | Huff et al. | 229/92.8 |
| 2002/0011512 | A1 | * | 1/2002 | Mehta et al. | 229/92.3 |

* cited by examiner

*Primary Examiner*—Jes F Pascua
(74) *Attorney, Agent, or Firm*—Sonnenschein Nath & Rosenthal LLP

(57) ABSTRACT

An advertisement device for direct mail delivery from a sender to a recipient. The advertisement device includes a synthetic panel having a front side, a back side, an advertisement on at least one of the front side and the back side, and a thickness sufficient to maintain integrity of the synthetic panel. The advertisement device also includes a response panel for responding to the advertisement. The response panel has information responsive to the advertisement thereon and is adapted to receive delivery information thereon. The response panel is attachable to the synthetic panel for direct mail delivery to the recipient with the synthetic panel, is detachable from the synthetic panel, and is adapted for direct mail delivery from the recipient to the sender.

7 Claims, 19 Drawing Sheets

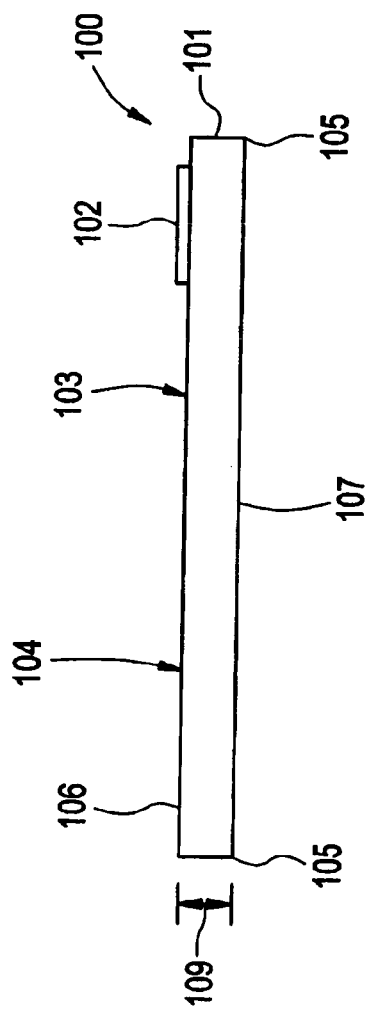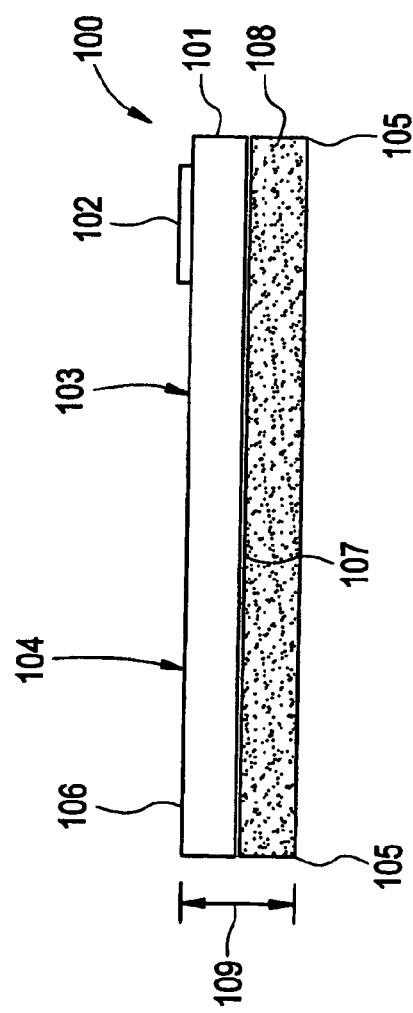

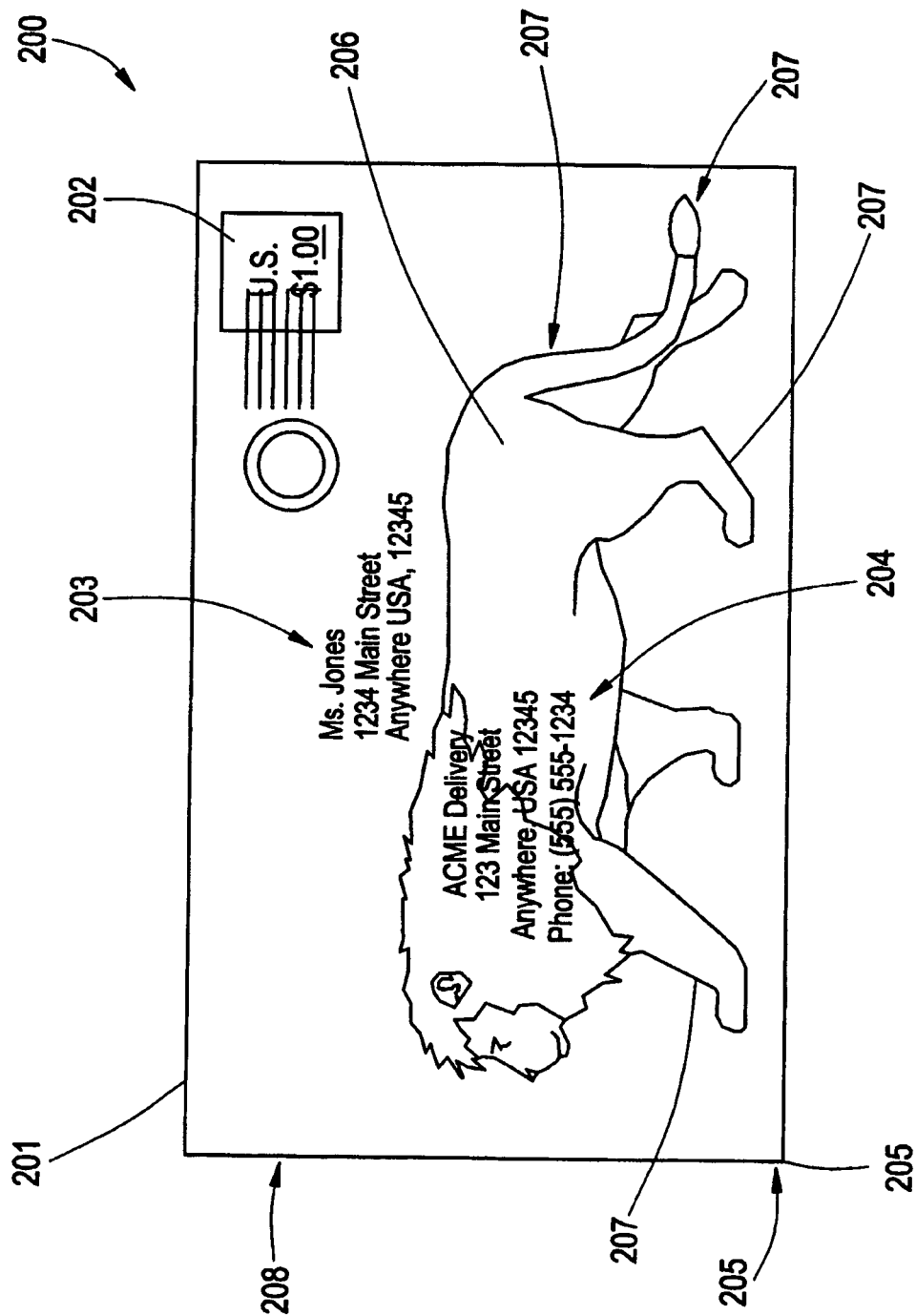

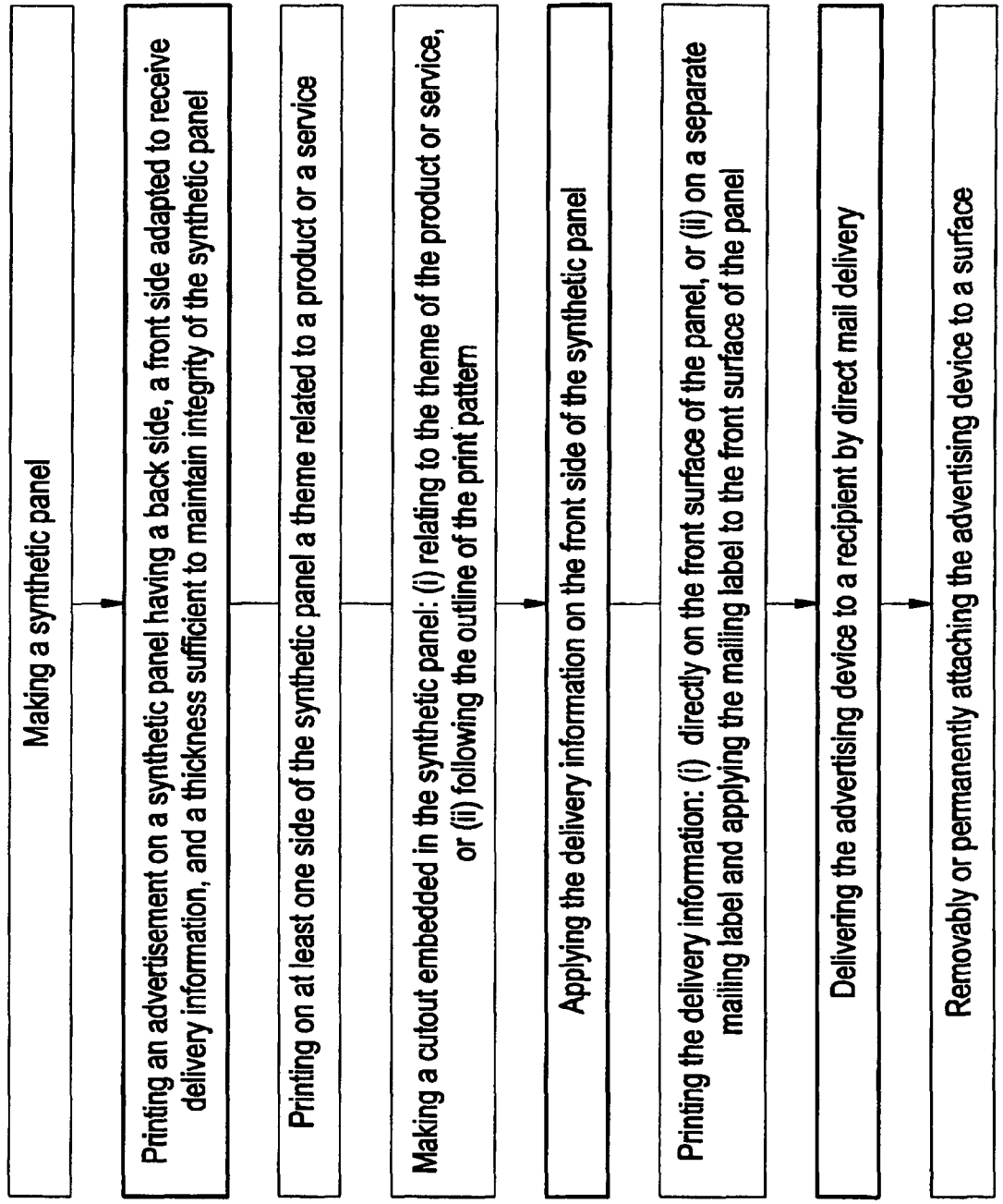

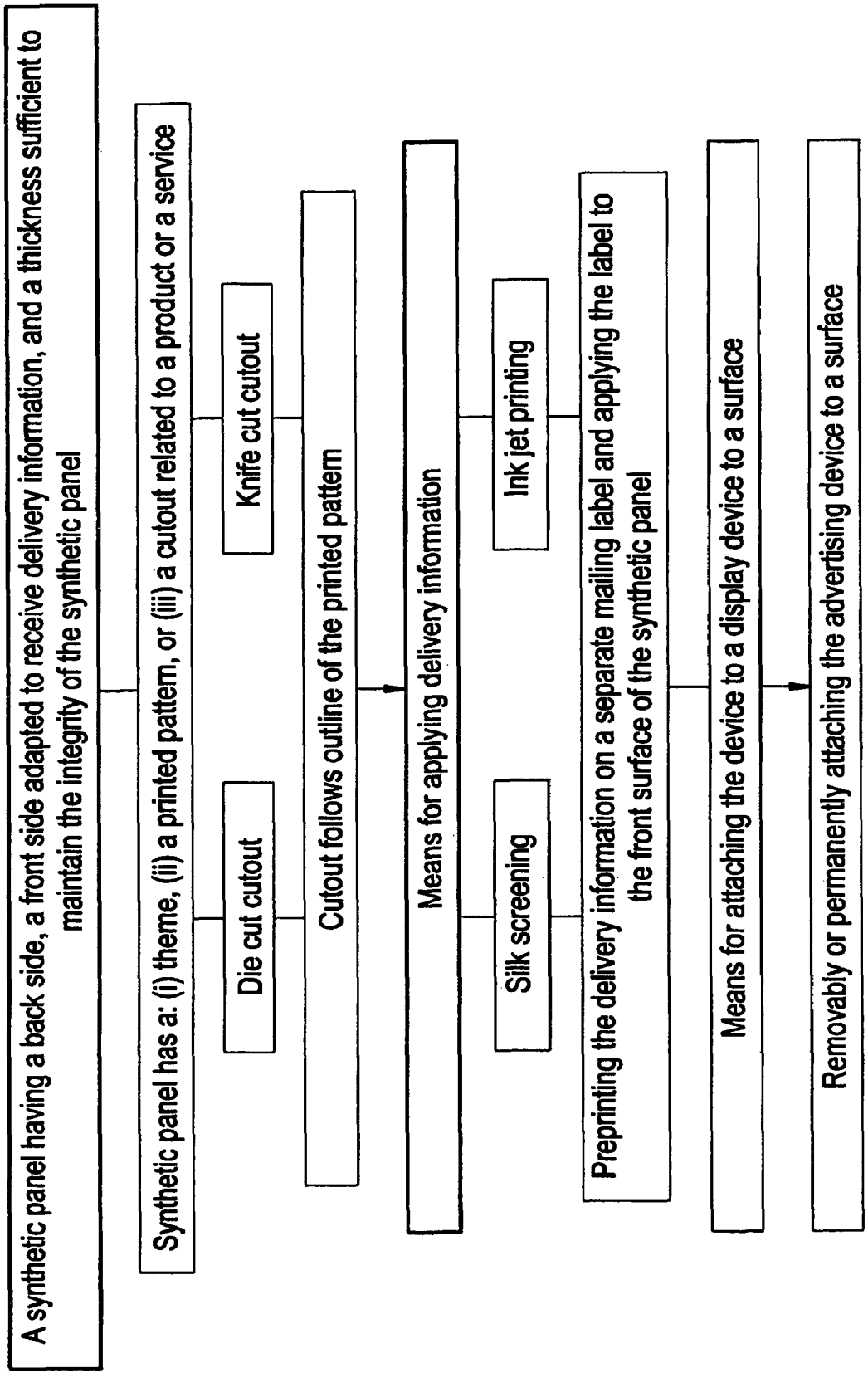

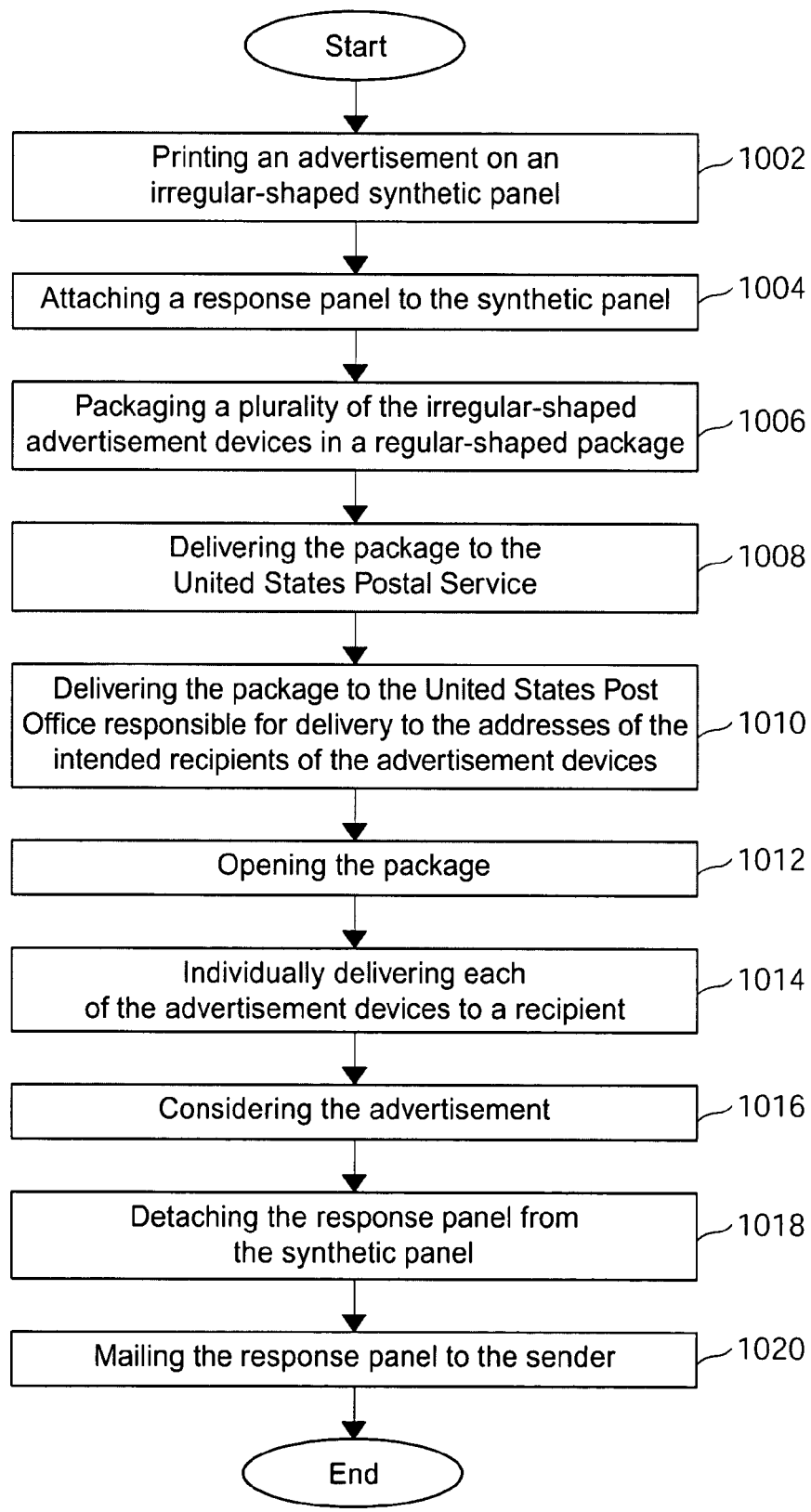

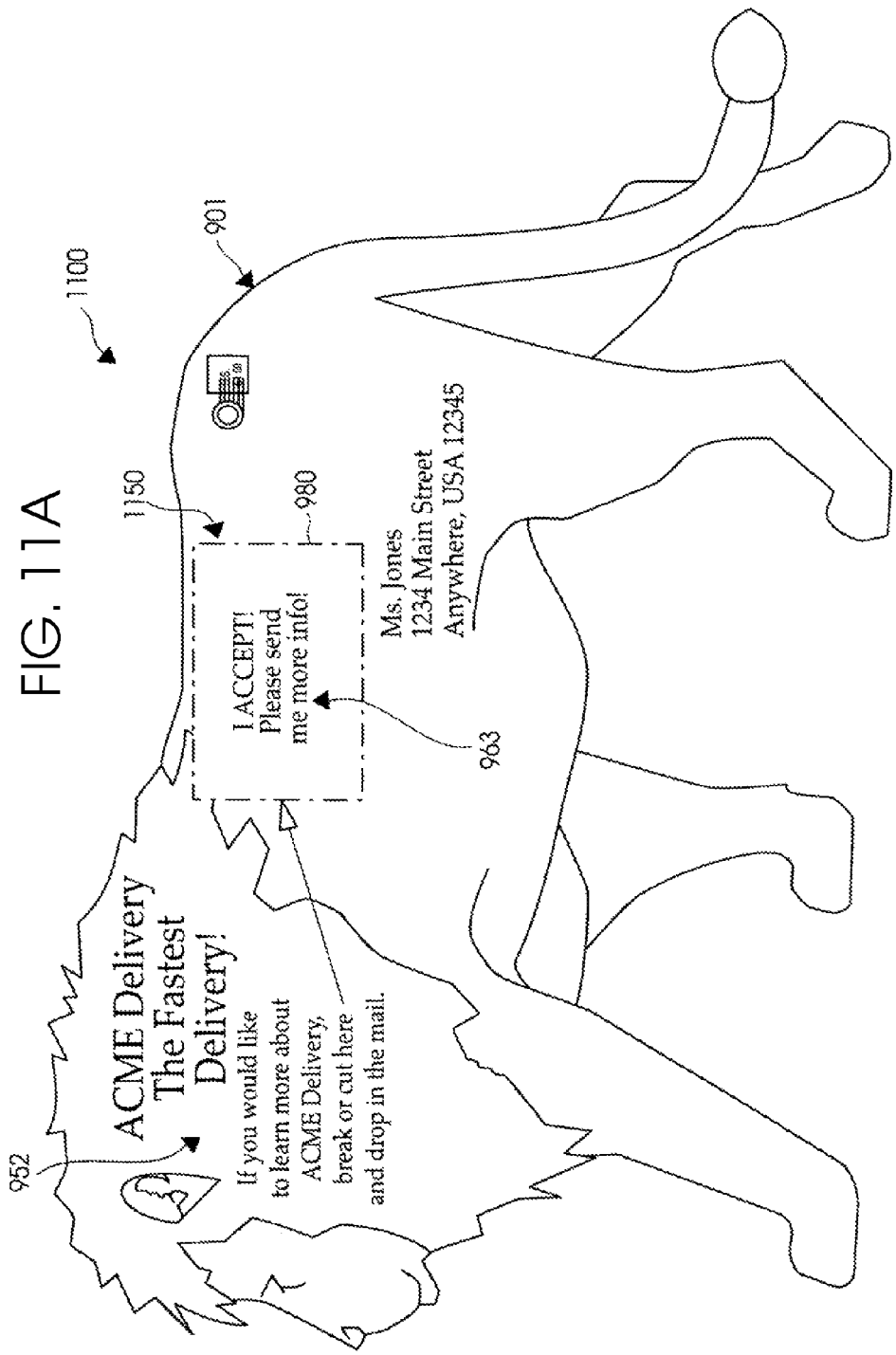

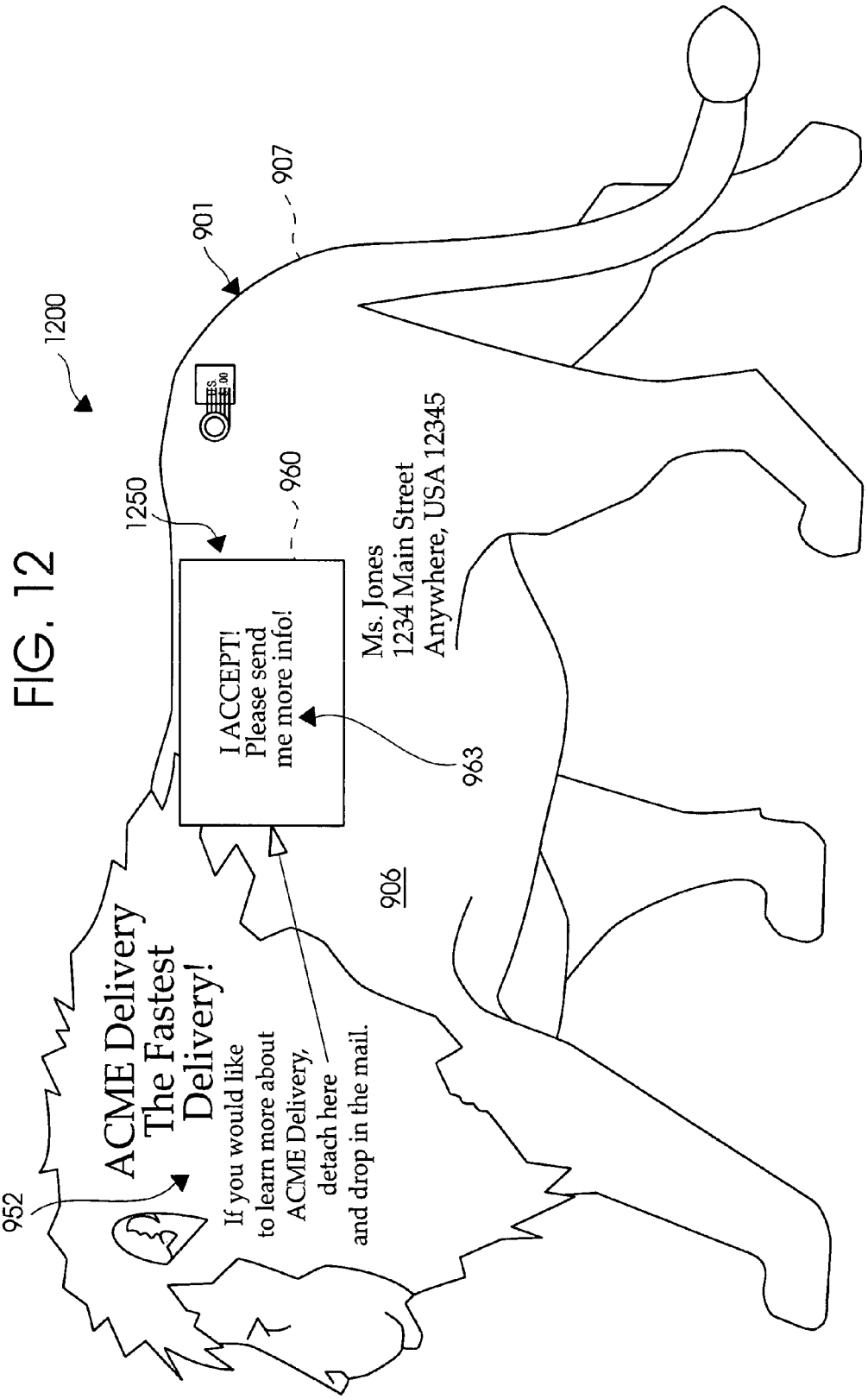

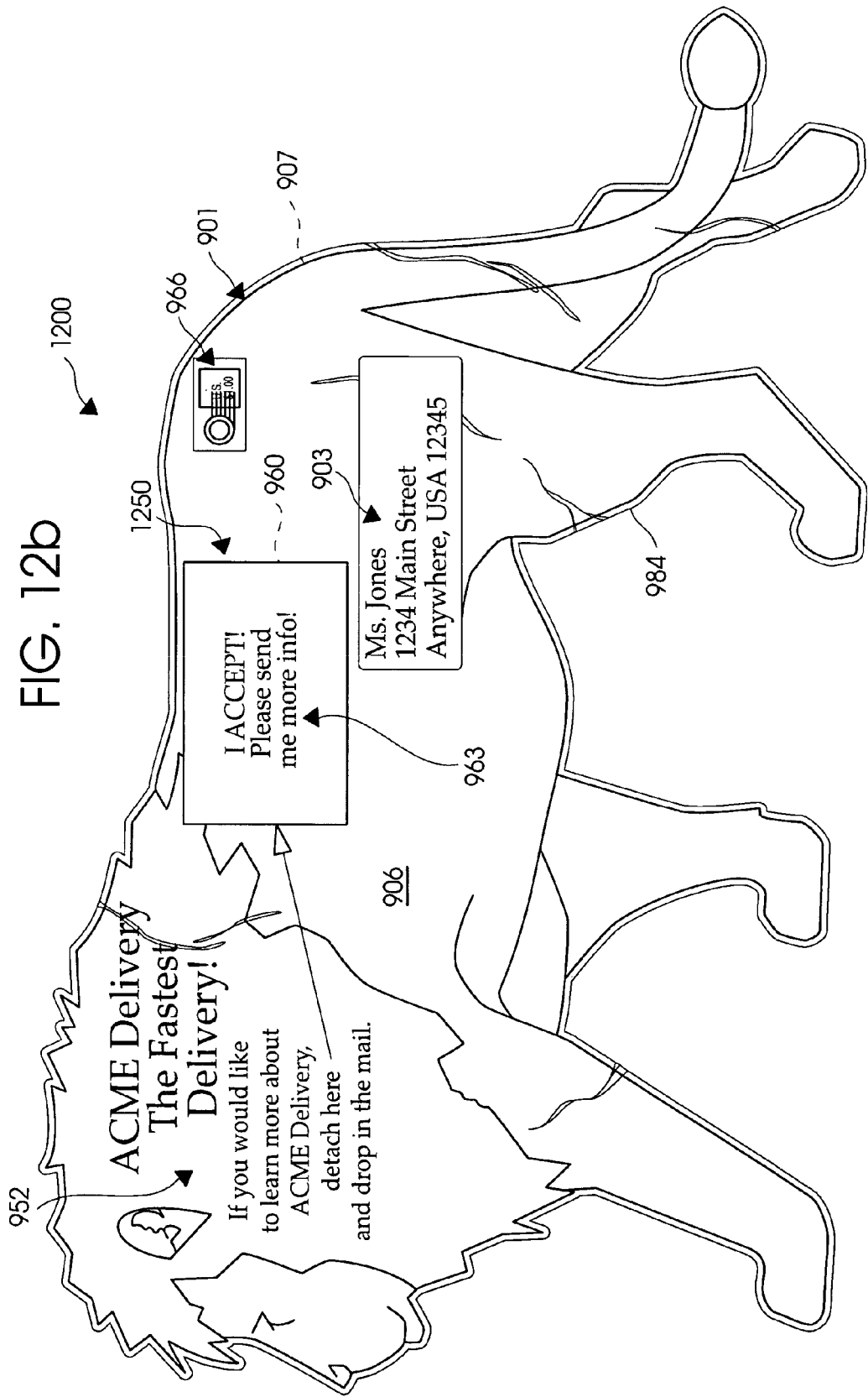

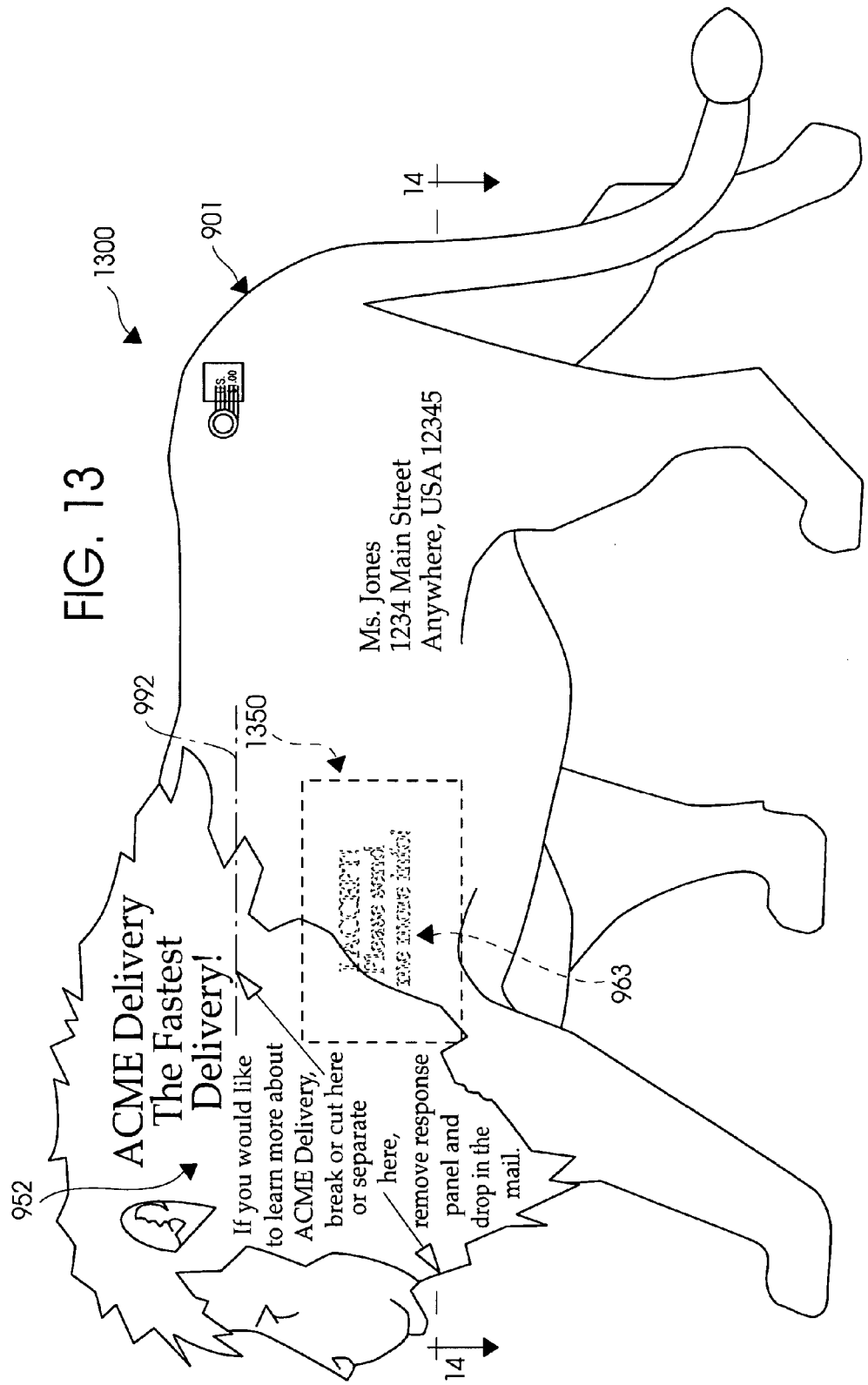

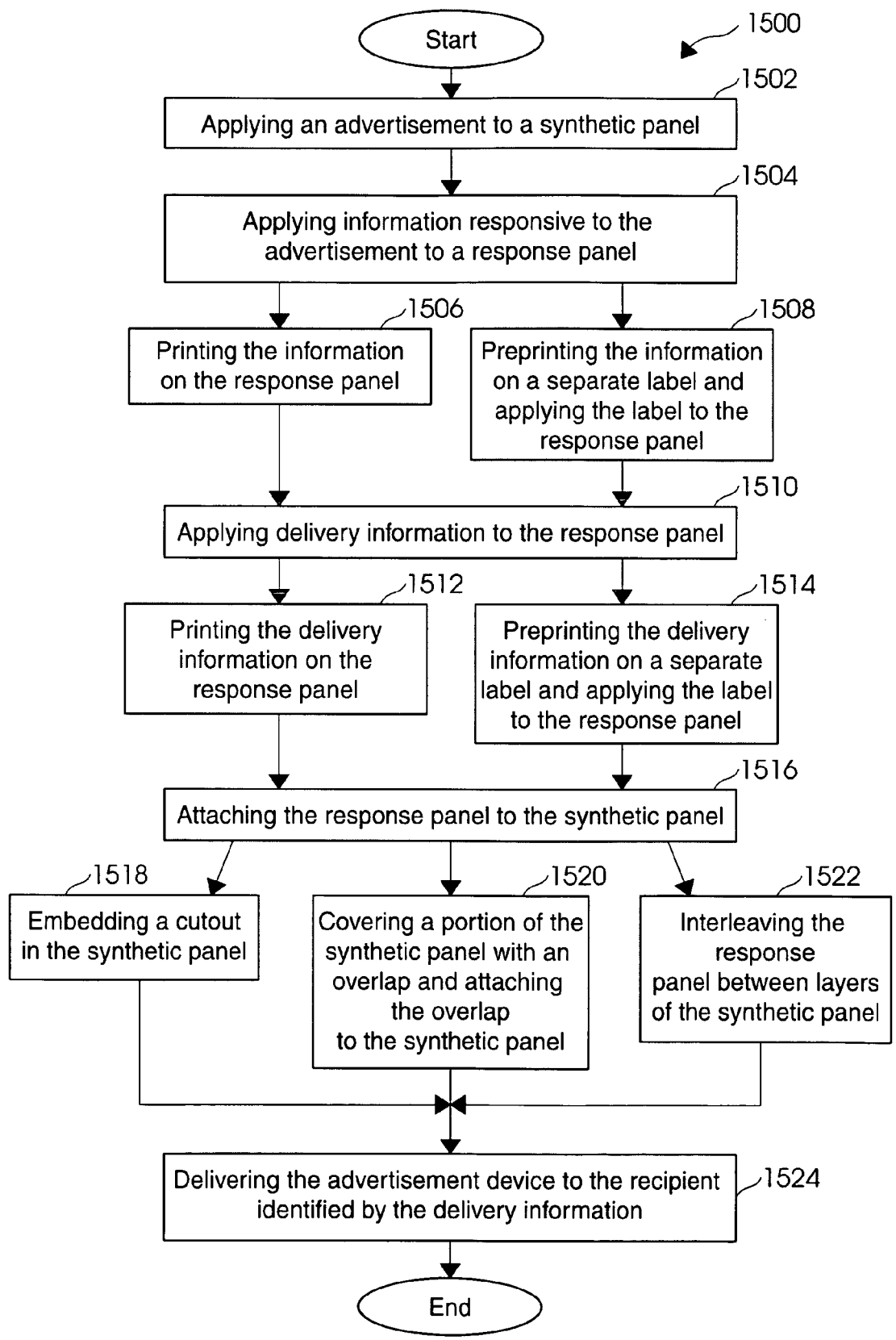

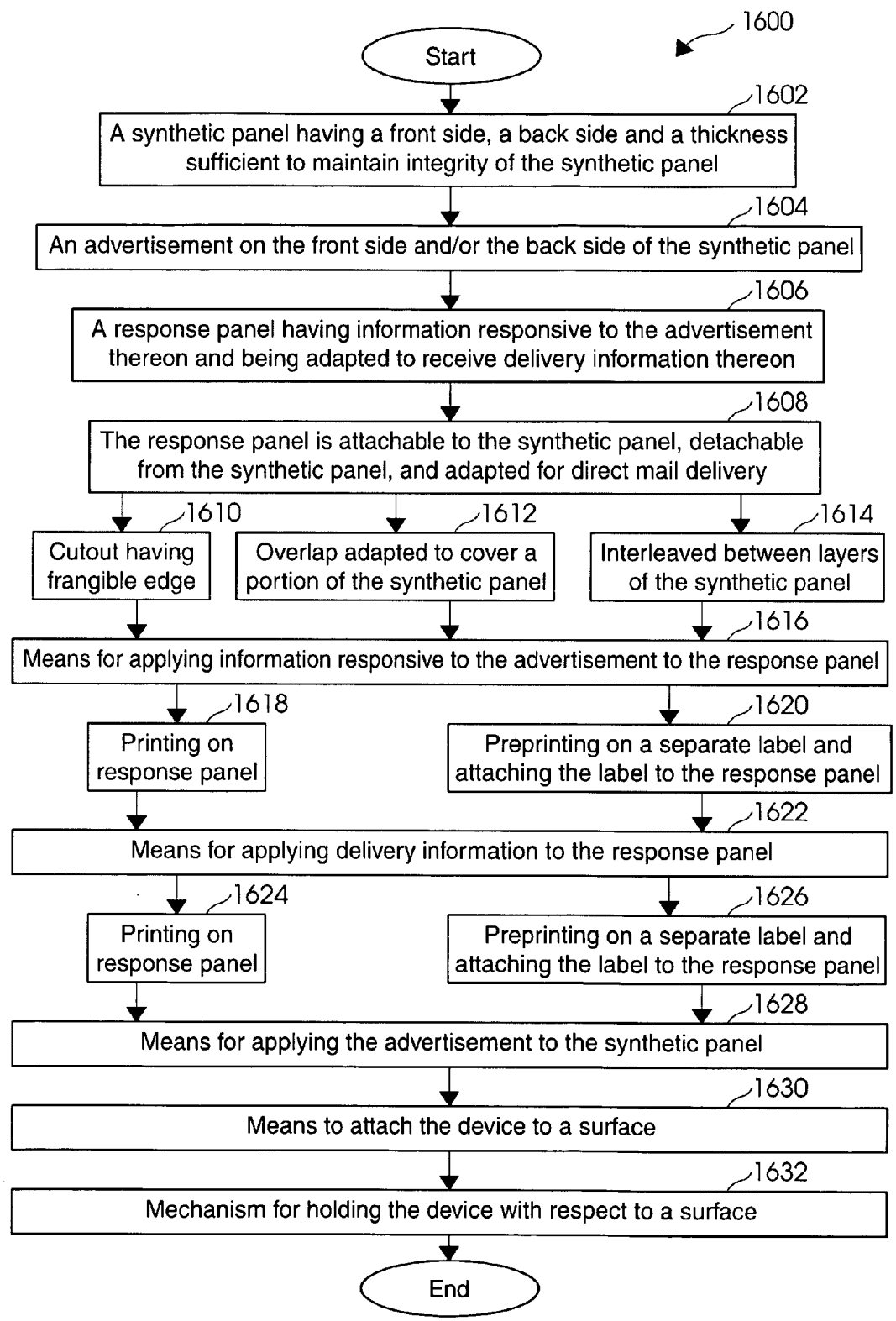

DIRECT MAILING DEVICE

CROSS REFERENCE TO RELATED APPLICATIONS

This application is a continuation in part and claims the benefit of U.S. application Ser. No. 10/865,358 filed Jun. 9, 2004, now abandoned, which claims the benefit of U.S. application Ser. No. 10/039,566, now abandoned.

FIELD OF THE INVENTION

This invention relates to advertising and, more particularly, to an advertisement device for direct mail delivery to a recipient.

BACKGROUND OF THE INVENTION

Marketers for centuries have attempted to grasp the attention of potential consumers by using whatever technology, service or infrastructure available. Most of these techniques, however, fail to provide any long-term impact on the purchasing decisions of the consumer. One method used to attract customers is to utilize the surface of retail display surfaces or display mediums, such as counter tops, or the interior or exterior surfaces of a wall or window of a store, a door, a building, or a vehicle, etc. However, this approach generally cannot impact purchasing decisions made at home, the work place, or any other location other than the retail location where advertisement is displayed.

Another method used to attract customers is mass mailing of printed material such as brochures, catalogs, postcards, advertisements enclosed in envelopes, and the like. However, these forms of advertisement are expensive to produce, handle, and/or deliver when compared to the results they obtain. Moreover, advertisements mailed in envelopes require not only the expense of complex machinery or labor to stuff the envelopes, but postage costs can also be expensive. Mailing brochures have similar problems in that they are expensive to produce and require machinery or people to fold and secure the brochures before they are mailed. Catalogs are also expensive to produce and mail.

While postcards avoid the problems associated with envelope mailing and brochures, they have limitations. For instance, postcards are made of paper generally to facilitate writing correspondence and address information on the postcard with a pen or pencil. As a result, postcards have several disadvantages. First, there are a limited number of printing techniques available for use with paper. Second, oil, dirt and water can stain a postcard. Third, the integrity of a postcard deteriorates with handling and time. For instance, postcards may be damaged in mailing or may become dog-eared with time and physical handling. These types of advertisements also commonly lack the dramatic impact required to grasp and hold the attention of consumers necessary to influence their purchasing decisions.

Another approach to attract customers is conventional print advertising. Conventional print advertising is accomplished by printing stationary non-moveable information and pictures on magazines, newspapers, brochures, flyers, posters, billboards, signs, wrapper, boxes, etc. Many conventional print advertisements and packages do not attract the attention of customers, and are ill suited for mass mailing.

Conventional print advertising materials or devices delivered to a recipient via a delivery service may also be susceptible to accumulating or carrying biological agents, such as microbes, bacteria, fungi, yeast, molds, and the like during shipping and handling in the delivery process. Such biological agents typically develop and grow fast, and can be harmful to the recipient (depending upon the type of biological agents that accumulate on the particular advertising material or device) because they may potentially inflict disease or other biological harm upon the recipient. It would, therefore, be desirable to provide print advertising materials or a mailing device and method for making the same that at least partially inhibits biological agents from forming, accumulating or developing thereon.

It is, therefore, desirable to provide an improved advertisement device that overcomes most, if not all, of the preceding problems, and which takes advantage of the availability of direct mail delivery services for mailing advertisements to consumers, and which may further take advantage of the availability of display surfaces controlled by and frequently seen by the consumer, such as countertops, walls, windows of buildings, vehicles and the like, for advertising products and/or services.

SUMMARY OF THE INVENTION

Systems and methods consistent with the present invention provide an advertisement device for direct mail delivery from a sender to a recipient. The advertisement device includes a synthetic panel having a front side, a back side, an advertisement on at least one of the front side and the back side, and a thickness sufficient to maintain integrity of the synthetic panel. The advertisement device also includes a response panel for responding to the advertisement. The response panel has information responsive to the advertisement thereon and is adapted to receive delivery information thereon. The response panel is attachable to the synthetic panel for direct mail delivery to the recipient with the synthetic panel, is detachable from the synthetic panel, and is adapted for direct mail delivery from the recipient to the sender.

In another aspect, a method is provided for delivering an advertisement device by direct mail delivery from a sender to a recipient, wherein the advertisement device includes a synthetic panel and a response panel. The method includes applying an advertisement to the synthetic panel, applying information responsive to the advertisement to the response panel, applying delivery information to the response panel for direct mail delivery of the response panel from the recipient to the sender, attaching the response panel to the synthetic panel such that the response panel is detachable from the synthetic panel by the recipient, and delivering the advertisement device to the recipient by direct mail delivery.

In yet another aspect, the present invention includes an advertisement device system for direct mail delivery from a sender to a recipient. The advertisement device system includes a synthetic panel having a front side, a back side, an advertisement on at least one of the front side and the back side, and a thickness sufficient to maintain integrity of the synthetic panel, and a response panel for responding to the advertisement. The response panel has information responsive to the advertisement thereon and is adapted to receive delivery information thereon. The response panel is attachable to the synthetic panel for direct mail delivery to the recipient with the synthetic panel, is detachable from the synthetic panel, and is adapted for direct mail delivery from the recipient to the sender. The advertisement device system also includes means for applying the information responsive to the advertisement to the response panel, and means for applying the delivery information to the response panel.

In even another aspect, the present invention includes an advertisement device for direct mail delivery from a sender to a recipient. The advertisement device includes a post card, a response panel, and an advertisement on at least one of the post card and the response panel. The response panel has information responsive to the advertisement thereon, is adapted to receive delivery information thereon, is attachable to the post card for direct mail delivery to the recipient with the post card, is detachable from the post card by the recipient, and is adapted for direct mail delivery from the recipient to the sender.

BRIEF DESCRIPTION OF THE DRAWINGS

The components in the figures are not necessarily to scale, emphasis instead being placed upon illustrating the principals of the invention. Moreover, in the figures, like reference numerals designate corresponding parts throughout the different views.

FIG. 2a is a cross-sectional view of the advertisement device of FIG. 1;

FIG. 2b is a cross-sectional view of the advertisement device of FIG. 1, with a means to detachably attach the advertisement device to a surface;

FIG. 3 is a front view of another example of the advertisement device, which has frangible edges and a cutout;

FIG. 5 is a schematic view of an example of a method of delivering to a recipient an advertisement device by direct mail delivery;

FIG. 6 is a schematic view of an example of an advertisement device system for direct mail delivery to a recipient;

FIG. 10 is a schematic view of an example of a method of delivering to a recipient an advertisement device having an irregular shape by direct mail delivery;

FIG. 11a is a front view of an example of the advertisement device wherein the response panel is a cutout;

FIG. 11b is a cross sectional view of the advertisement device of FIG. 11a

FIG. 12 is a front view of an example of the advertisement device wherein the response panel is an overlap;

FIG. 12b is a front view of the advertisement device of FIG. 12 including a wrapping;

FIG. 13 is a front view of another example of the advertisement device with a response panel for responding to an advertisement;

FIG. 15 is defines an exemplary flow diagram of a method of delivering to a recipient an advertisement device by direct mail delivery in accordance with the present invention; and FIG. 16 is a schematic view of another example of an advertisement device system for direct mail delivery to a recipient.

DETAILED DESCRIPTION OF THE INVENTION

While the present invention may be embodied in many different forms, several specific embodiments are discussed herein with the understanding that the present disclosure is to be considered only as an exemplification of the principles of the invention, and it is not intended to limit the invention to the embodiments illustrated. Where the invention is illustrated herein with particular reference to front and back, or top and bottom, or left and right, it is understood that any other orientation along any axis of the advertisement device can, if desired, be substituted for the embodiments as herein described.

The present invention is generally directed to an advertisement device for direct mail delivery to a recipient. The advertising device comprises a synthetic panel, having a back side, a front side, at least one of the back side and the front side adapted to receive delivery information, and a thickness sufficient to maintain integrity of the synthetic panel. A method of delivering an advertisement device to a recipient is also provided. The method comprises printing an advertisement related to a product and/or a service on a synthetic panel having a back side, a front side, at least one of the front side and the back side adapted to receive delivery information, and a thickness sufficient to maintain integrity of the synthetic panel; applying the delivery information to the synthetic panel; and delivering the advertisement device to a recipient by a direct delivery mail service. An advertisement device system for direct mail delivery to a recipient is also provided. The advertisement device system comprises a synthetic panel, having a back side, a front side, at lease one of the back side and the front side adapted to receive delivery information, and a thickness sufficient to maintain integrity of the synthetic panel; and a means for applying delivery information. The synthetic panel may take a shape related to a theme of the product or the service being advertised. Further, this shape may be formed using a partially perforated cutout that is at least partially embedded in the synthetic panel.

The synthetic panel (101, 201) is a panel made of material produced by synthesis, and not of natural origin, such as from synthetic chemical compounds or material. Such material includes, but is not limited to, vinyl, styrene, polyester, polyvinyl chloride, plastic, fabric, nylon, Nomex™, Kevlar™, polyethylene terephthalate, polycarbonate, acrylic, Plexiglas™, polypropylene, polyethylene, polystyrene, acrylonitrile-butadiene-styrene terpolymer, polyphenyleneoxide-polystyrene, polyurathane, and polyamides, and blends and combinations thereof.

Figure 1:
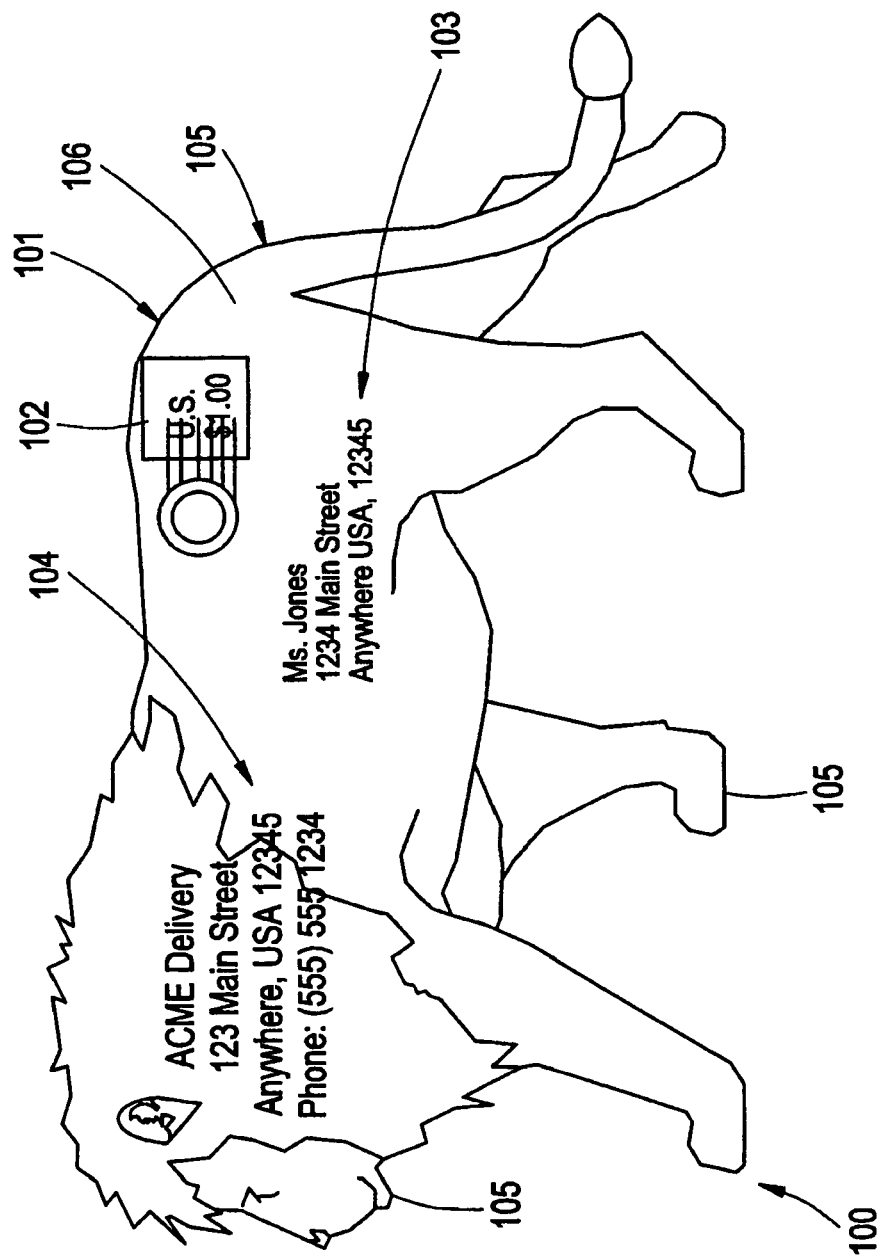
FIG. 1 is a front view of one example of the advertisement device.

Referring to FIG. 1, the front side of an advertising device (100) is shown having a synthetic panel (101), with a front surface (106); a theme related to Acme delivery service (a fictitious delivery company); a printed pattern and a shape resembling a lion, which represents the fictitious trademark and service theme of Acme Delivery; contact information (104) for Acme Delivery printed on the front surface of the synthetic panel (101); an edge (105); delivery information (103) printed on the front surface (or the back surface in alternate embodiments) of the synthetic panel (101); and postage (102) for direct mail delivery. Referring to FIG. 2a, the advertising device (100) of FIG. 1 is shown in cross section, having a back surface (107), and a thickness (109) sufficient to maintain integrity of the synthetic panel (101). Referring to FIG. 2b, a second example of the type of advertising device depicted in FIG. 1 is shown in cross section. As this cross-section shows, this example has (in addition to many of the attributes) means for detachably or permanently fastening (108) the advertising device to a display surface, and a thickness (109) sufficient to maintain integrity of the synthetic panel (101).

Synthetic panel (101, 201) has several advantages that make it better for use in direct mail advertising. For instance, the synthetic panel is resistant to soiling from dirt, oil, water, and the like; maintains its integrity during: (a) the printing and die cut or molding processes, (b) handling by a direct mail delivery service, (c) handling by a recipient, and (d) its continued display.

The synthetic panel is preferably of sufficient thickness to maintain integrity of the synthetic panel during direct mail delivery to a recipient and, thus, through its continued use and display by the recipient. In one embodiment, the synthetic panel has a thickness of between about 0.001 mm to about 10.0 mm. However, it is contemplated that synthetic panel of the advertisement device could be between about 0.05 mm to about 2.0 mm in thickness or even between about 0.175 mm to about 0.75 mm in thickness, the thickness being essentially a design choice. The synthetic panel (101, 201) can be flexible or inflexible. The synthetic panel may be opaque, transparent or translucent. In fact, the synthetic panel (101, 201) can include paper, covered, layered, laminated, coated or embedded with a synthetic material in such a manner as to achieve some or all of the benefits provided by the synthetic materials.

The synthetic panel member of the advertisement device (100, 200) will generally be printed with alphanumeric and graphic information. The use of a synthetic panel makes it necessary to utilize specialized printing materials and techniques, such as silk screening printing processes, sheet fed or web offset printing, web letter press printing, gravure printing, or printing utilizing ink jet printing technology. The printing inks are generally formulated for printing on the synthetic materials (as opposed to paper-type substrates) for enhanced adhesion and practical durability, such that the printing inks may be generally indelible. Examples of the synthetic formulated printing inks include those manufactured and sold commercially by the companies Toyo Ink America LLC (with an office at 910 Sylvan Avenue, Englewood Cliffs, N.J. 07632 201-568-8660), Kohl & Madden® (with an office at 222 Bridge Plaza South, Ft. Lee, N.J. 07024 201-886-1203), Handschy Industries (with an office at 13601 S. Ashland Avenue, Riverdale, Ill. 60628 708-597-7990) and INX International Ink Company (with an office at 651 Bonnie Ln., Elk Grove Village, Ill. 60007 847-981-9399). A portion or the entire front and/or back surface of the synthetic panel of the advertising device can be printed, herein termed the "print pattern." The print pattern is typically a pattern of dots, lines or other plurality of discrete elements and/or a grid pattern surrounding a plurality of unprinted areas. A synthetic panel can contain names, words (for example, delivery or contact information), symbols, phrases, terms, advertising, such as a multicolor logo, or a design, such as a picture, emblem or logo, and/or other pictures or scenes, etc., including for example, trade names, trademarks, and/or service marks. One or both sides of the synthetic panel can receive printing or coating with appropriate materials. Delivery or contact information generally contains the name (or "current resident") and address of the recipient and postage where, for example, the United Stated Postal Service is used.

The synthetic panel may also have at least one printed pattern or advertisement printed thereon related to a theme of a product and/or a service; and/or a shape related to a theme of a product and/or a service; and/or a cutout at least partially embedded in the synthetic panel related to a theme of a product and/or a service. The cutout may be a geometric (e.g. square, trapezoidal, oval, elliptical, circular, triangular, rectangular, polygonal) or a contoured shape. Contoured shapes can resemble, for example, the shape of any object, person, place or thing such as historical figures, celebrities, animals, electronic or mechanical devices; vehicles, appliances; toys; personal items; an item of commerce (e.g. credit cards, or trademarks, and food items). The shape of a synthetic panel or cutout, however, is not critical. And a synthetic panel or cutout can be shaped in many forms too numerous to be listed herein, but are nonetheless contemplated to be included within the scope of the present invention.

Figure 4A:
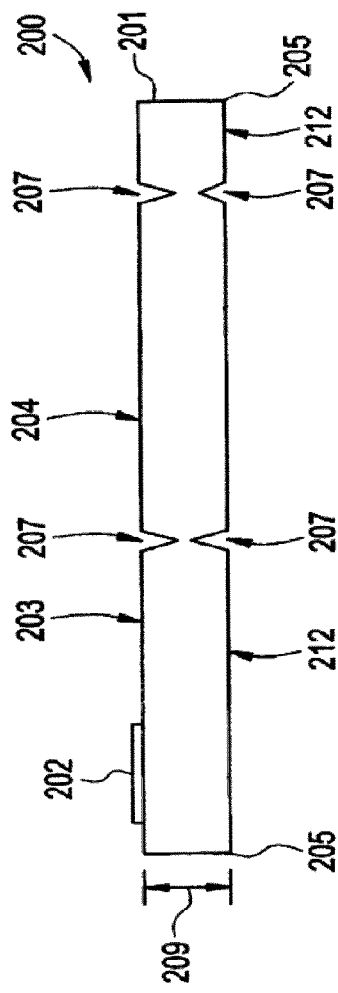
FIG. 4a is a cross-sectional view of the advertisement device of FIG. 3.
Figure 4B:
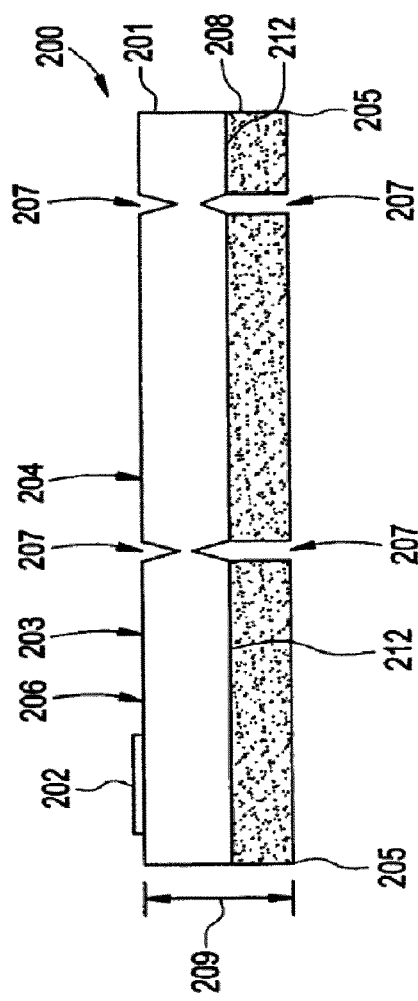
FIG. 4b is a cross-sectional view of the advertisement device of FIG. 3, with a means to detachably attach the advertisement device to a surface.

In one approach, the shape may be solely pre-configured to facilitate formation. Referring to FIG. 3, the front side of an advertising device is shown having a synthetic panel (201), having a cutout (207) with a frangible edge delineated by a score or a cut; an edge (205); delivery information (203) printed on one of the front surface (206) or the back surface (hidden from view in FIG. 3) of the synthetic panel (201); postage (202) for direct mail delivery; and a cutout (207) having a theme related to Acme delivery service, and contact information (204) for Acme Delivery printed on the surface of the cutout (207). Referring to FIG. 4a, the advertising device of FIG. 3 is shown in cross section, having a back surface (212); a thickness (209) sufficient to maintain integrity of the synthetic panel during direct mail delivery to the recipient; and a cutout (207) having an area on the front surface (206) of the cutout (207) adapted to receive contact information for Acme Delivery, and a back surface (212). FIG. 4b shows the types of the advertising device with means for detachably fastening (208) the advertising device to a display surface applied on the back surface of the frangible edge and the cutout (207).

In one embodiment, an anti-microbial agent is added to the synthetic material of the synthetic panel or mailing device to help at least partially inhibit the growth, development or accumulation of undesirable biological agents thereon. Such undesirable biological agents may include, for example, microbes of bacteria, yeast, fungi, mold, and the like. To inhibit their growth, development or accumulation, an anti-microbial agent, such as a predetermined chemical or compound that can serve such purpose, is incorporated into the synthetic material of the synthetic panel or mailing device when the synthetic material is manufactured or prepared, such as when it is extruded into sheets for example. Various types of anti-microbial agents are available commercially for such purpose, such as those sold by Microban® Products Company, which has an office at 11515 Vanstory Drive, Huntersville (N.C.) 28078 (704-875-0806) and AgION Technologies L.L.C., which has an office at 60 Audubon Road, Wakefield, Mass. 01880 (781-224-7100). Some of these anti-microbial agents, or chemicals, can be added to most types of molecular plastics, synthetic fibers, and the like. The anti-microbial agents are added to the synthetic material typically in a predetermined ratio or amount when the synthetic material is manufactured, and they usually last in the synthetic material for most of the lifetime of the product. The anti-microbial agents are typically odorless, tasteless and colorless, and therefore do not alter the physical characteristics of the synthetic panel or mailing device in any significant manner. Accordingly, in such embodiment, the synthetic panel or mailing device may be more desirable for public use as it is less likely to carry or deliver disease-causing microbes or biological agents to the recipient because the growth, development or accumulation thereof on the device is reduced considerably.

In another embodiment, an anti-microbial agent is added to the ink used for printing the aforementioned alphanumeric and graphic information on the synthetic panel or mailing device. Such anti-microbial agents are also commercially available from the two companies mentioned above, and perform a substantially identical function as discussed above for the anti-microbial agents added to the synthetic material. In such embodiment, accordingly, the synthetic panel or mailing device may also be more desirable for public use as it is less likely to carry or deliver disease-causing biological agents to the recipient because the growth, development or accumulation thereof on the device is reduced considerably.

In an alternate embodiment, an anti-microbial agent is added to the material of the synthetic panel or mailing device, and an anti-microbial agent is also added to the ink used for imprinting thereon. It will be appreciated that such embodiment offers dual protection against biological agents on the device, and should accordingly be more desirable. However, it is recognized that such embodiment may carry a comparatively higher manufacturing cost because of the added cost of adding anti-microbial agents to both the synthetic material and the ink.

In another embodiment, a coating is applied upon at least one surface of the synthetic panel or mailing device, and the coating includes an anti-microbial agent. Preferably, however, substantially all surfaces of the synthetic panel or mailing device includes the aforementioned coating applied thereon. The relatively narrow edges of the synthetic panel or mailing device, for example, may not have the coating applied thereon, but the comparatively broader front surface and back surface thereof will therefore comprise the aforementioned substantially all surfaces of the synthetic panel or mailing device that have the coating. Such anti-microbial agents are also commercially available from the two companies mentioned above, and perform a substantially identical function as discussed above for the anti-microbial agents added to the synthetic material. In such embodiment, the synthetic panel or mailing device may likewise be more desirable for public use as it is less likely to carry or deliver disease-causing biological agents to the recipient because the growth, development or accumulation thereof on the device is reduced considerably.

A method of delivering an advertisement device by direct mail delivery to a recipient is also provided. Referring to FIG. 5, one example of a method of delivering an advertisement device by direct mail delivery to a recipient is shown. The method of FIG. 5 may include printing an advertisement on a synthetic panel having a back side, a front side, at least one of the back side and the front side adapted to receive delivery information, and a thickness sufficient to maintain integrity of the synthetic panel; applying the delivery information to at least one of the front side and the back side of the synthetic panel; and delivering the advertising device to a recipient by the direct mail delivery. The delivery information may be printed directly on the surface of the synthetic panel, or the delivery information may be printed on a separate mailing label and then applied to the surface of the synthetic panel. The advertisement device may also have printing on at least one side of the synthetic panel a theme related to a product and/or a service. A cutout may also be at least partially embedded in the synthetic panel and may have a shape relating to a theme of a product and/or a service. The cutout may also follow the outline of the print pattern. The method may also include making a synthetic panel. The method may also include removably or permanently attaching the advertisement device to a surface for display. The method may also include adding an anti-microbial agent to the material of the synthetic panel. The method may also include adding an anti-microbial agent to the ink used for imprinting upon the synthetic panel. The method may also include applying a coating comprising an antimicrobial agent on at least one surface of the synthetic panel, or preferably upon substantially all surfaces of the synthetic panel.

The term "direct mail delivery" refers to the delivering of an advertisement device to a recipient using a courier or delivery service that transports and delivers documents, packages, cargo, parcels, and/or freight by land, sea and/or air. Such delivery services that can be used in the present invention, including but not limited to, mail delivery services such as the United States Postal Service, Federal Express Inc. (FedEx®), United Parcel Service, Inc. (UPS®), Airborne Express, Inc., and RPS, Inc., to name a few.

An advertising device system for direct mail delivery to a recipient is also provided. Referring to FIG. 6, one example of an advertising device system is shown. The advertisement device system of FIG. 6 may include a synthetic panel, having a back side, a front side, at least one of the back side and the front side adapted to receive delivery information, and a thickness sufficient to maintain integrity of the synthetic panel; and means for applying delivery information. The means for applying the delivery information may include silk screening, sheet fed printing, web offset printing, web letter press printing, gravure printing, and/or ink jet printing. Also, the means for applying the delivery information may include preprinting the delivery information on a separate mailing labeled and applying the label to the surface of the synthetic panel. The advertising device system may also include a synthetic panel with a theme related to a product and/or a service. The advertising device system may also have a synthetic panel with a printed pattern related to the theme of a product and/or a service; and a cutout embedded in the synthetic panel related to a theme of the product and/or a service. The cutout may be die cut or knife cut, for example. Or, the panel may even be molded in a predetermined shape by any one of the various ways known in the art. The cutout or molded panel may also follow the outline of the print pattern. The advertising device system may also include a means to removably or permanently attach the device to a surface with an adhesive, double sided tape, a loop fastener, a pile fastener, a magnet, magnetized sheeting, magnetic tape, a screw, a snap, and/or fastening tape.

The synthetic panel may also be provided with an overlaid pattern, graph, or charted surface, for example by silk-screening, to facilitate the presentation of information, or have a printed chalk compatible surface for use with chalk. Similarly, the synthetic sheet may be selected for use with dry-erase markers to provide further utility to the advertisement device.

In another embodiment of the present invention, the advertisement device is adapted for mounting on a display surface or medium, such as a wall, window or a door, etc. Such mounting is accomplished with means for fastening the advertisement device to a display surface. Such means include, but are not limited to, adhesive, heat lamination, double sided tape, loop fasteners, magnets, magnetized sheeting, magnetic tape, screws, snaps, fastening tape, buttons and button holes, stitches, suction cups, hook and eyes, zipper, static cling material, lock and key, and pile fasteners.

Figure 7:
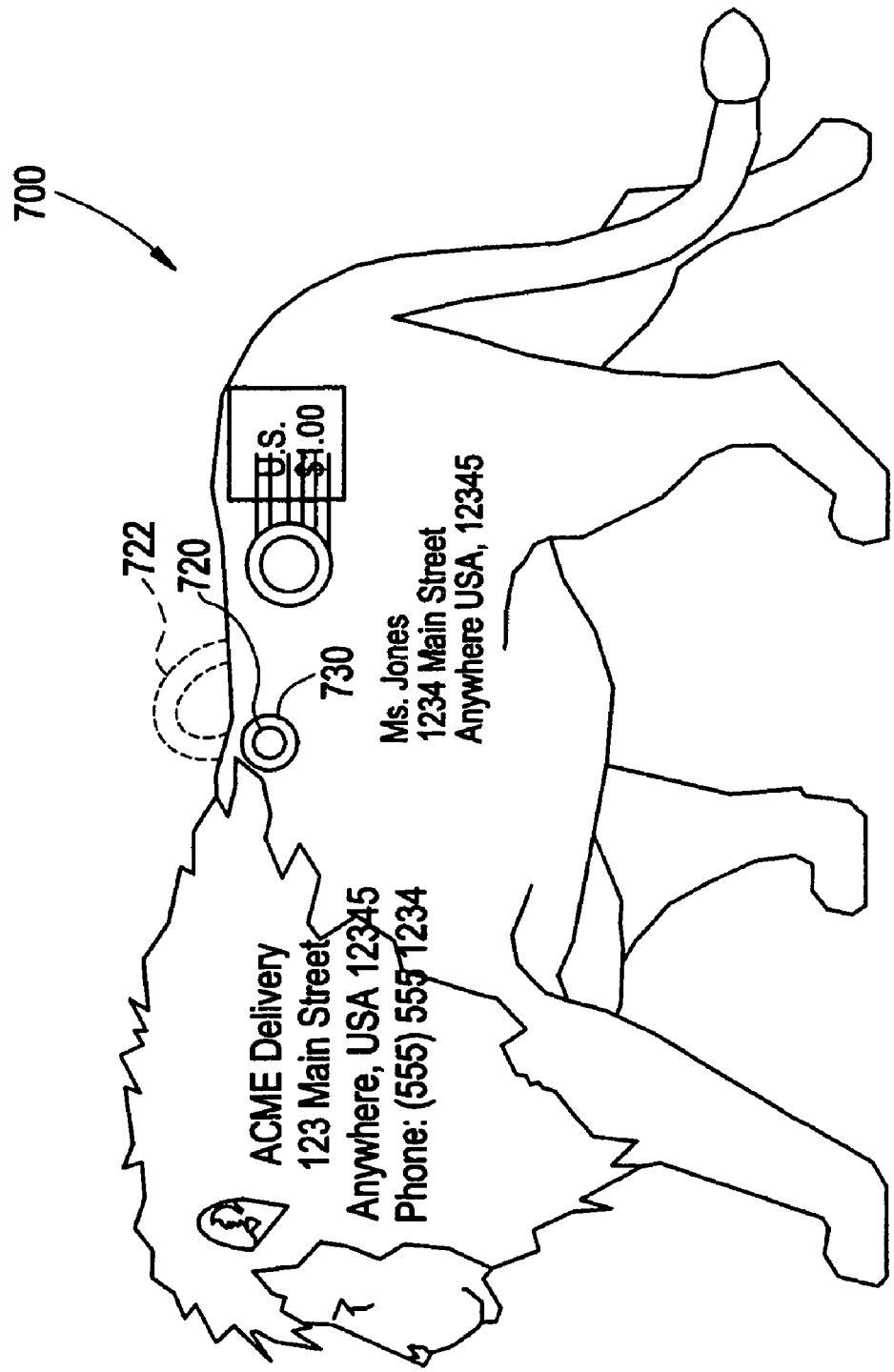
FIG. 7 is a front view of an alternate embodiment of the advertisement device with a mechanism to hold the device with respect to a surface.

Referring to FIG. 7, a front view of an alternate embodiment of the advertisement device with a mechanism to hold the advertisement device with respect to a surface is shown. The advertisement device (700) essentially includes a mechanism, or means, for holding the device (700) with respect to a surface, such as a substantially vertical surface like a wall, to display the advertisement device (700). This feature adds to the permanence effect of the advertisement device (700) for the recipient. The mechanism for holding the device (700) with respect to a surface may be one of any number of types, such as a hole (720) in the device (700). It will be appreciated that the device (700) can be held with respect to a surface, such as a vertical surface like a wall, by inserting a nail or a hook through the hole (720). Further in this embodiment, the hole (720) may include a grommet (730), such as a metal or rubber grommet, lining the periphery of the hole (720) to protect the edges of the hole (720) from getting damaged during use. In another embodiment, device (700) includes a hanging extension (722) for holding the device (700) with respect to a surface. The hanging extension (722) is shown in phantom in FIG. 7, and includes an opening that may be cooperatively engaged with a nail, a hook, or the like. The hanging extension (722) may be a part of the device (700) formed along with the device (700) when it is manufactured, thereby being integral with the device (700). In another embodiment, the hanging extension.(722) may be an additional component substantially rigidly attached to the device (700), such as a string, a relatively thick thread-like material, or the like. Accordingly, those skilled in the art will appreciate that a number of different means may be implemented in the device (700) to serve the purpose of holding it with respect to a surface, such as displaying the device from a vertical surface, without departing from the spirit and scope of the present invention, and therefore all such embodiments are recognized and anticipated and it is intended that the claims hereof will cover all such embodiments.

Figure 8:
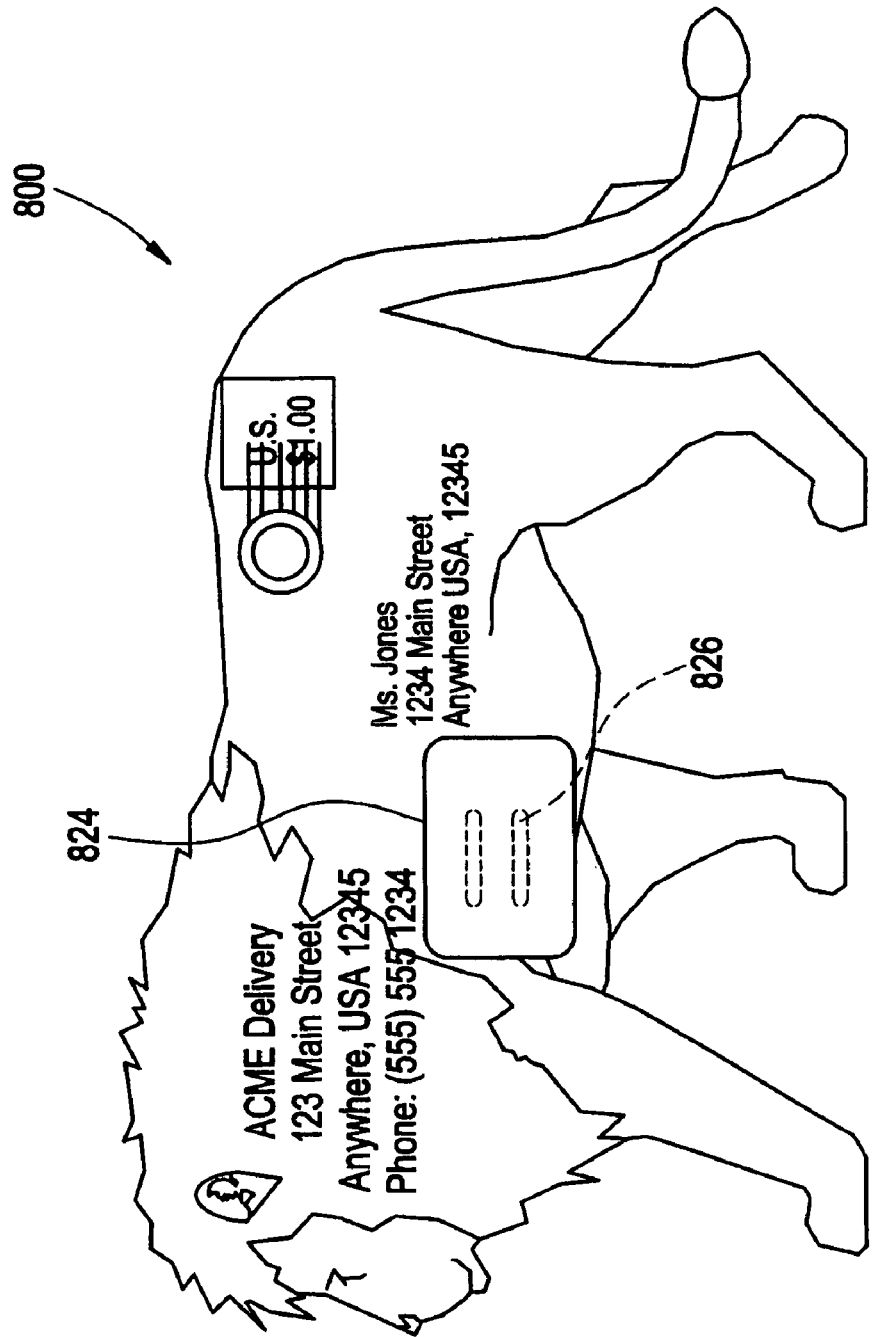
FIG. 8 is a front view of an alternate embodiment of the advertisement device with a mechanism to carry another item therewith to a recipient.

Referring to FIG. 8, a front view of an alternate embodiment of the advertisement device with a mechanism to carry another item therewith to a recipient is shown. Sometimes, it might be desirable to send an extraneous item (824), such as a business card, a credit card, or a relatively flat magnetic item that displays some relevant images and/or alphanumeric information, etc., to the recipient along with the device (800). Typically, such extraneous item (824) will be relatively flat and thin, such as a coupon, a credit card, a refrigerator-magnet, etc., although it is recognized and anticipated that it may also have a different shape and/or dimensions. The extraneous item (824) may be removably or permanently affixed to the device (800). In one embodiment wherein the extraneous item (824) is removably affixed to the device (800), the extraneous item (824) may be removably adhered to the device (800) by one or more strips of an adhesive (826) (shown in phantom in FIG. 8) whereby the extraneous item (824) can be selectively peeled off from the device (800) by the recipient or another user. The implementation and composition of such strips of adhesive is known in the art. Alternatively, the extraneous item (824) may be shrink-wrapped or overlaminated with the device (800), whereby it can be selectively unwrapped and/or detached from the device (800) by a user. The overlamination, for example, could be with a material, such as a plastic overlaminating film, that serves to hold the extraneous item (824) with respect to the device (800). In another embodiment, the extraneous item (824) is substantially permanently attached to the device (800). In such embodiment, for example, the extraneous item (824) may include a magnetic surface, whereby the device (800) may be magnetically attached to a magnet-attractable surface, such as a refrigerator door.

Figure 9:
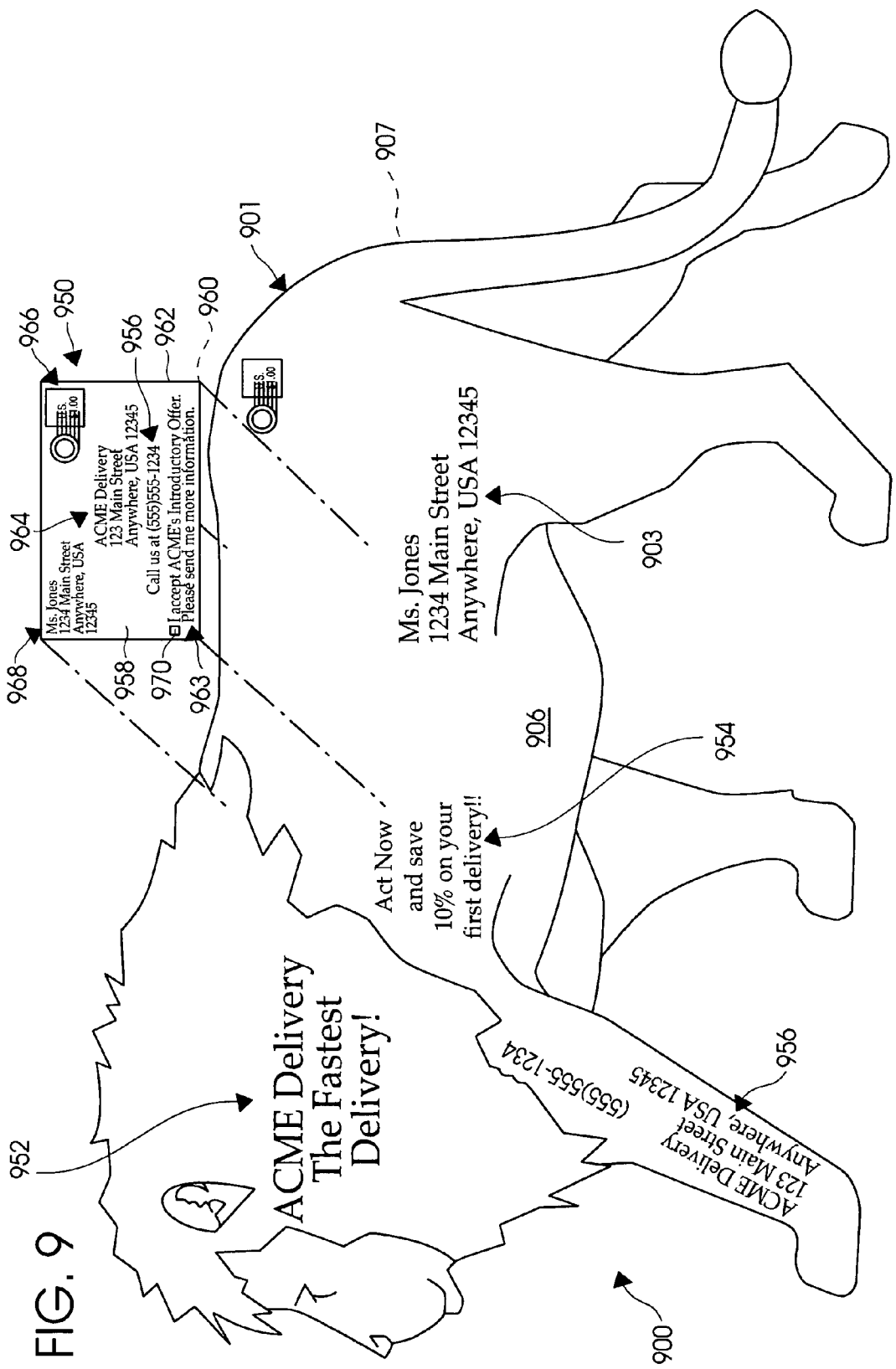
FIG. 9 is a front view of another example of the advertisement device with a response panel for responding to an advertisement.

Referring to FIG. 9, a front view of an alternate embodiment of the advertisement device with a response panel for responding to the advertisement is shown. The advertisement device (900) includes a synthetic panel (901) and a response panel (950) for responding to an advertisement (952) on at least one of the synthetic panel (901) and the response panel (950). The synthetic panel (901) is substantially similar to the synthetic panel (101, 201) described herein, and therefore the synthetic panel (901) may have any or all of the characteristics, properties, components and/or functionalities of the synthetic panel (101, 201), regardless of whether such characteristics, properties, components, and/or functionalities are discussed below. In an alternative embodiment, the advertisement device (900) includes a post card (not shown) made of a non-synthetic material in place of the synthetic panel (901). In such an alternative embodiment, the post card may be formed from any suitable non-synthetic material(s), such as paper and/or cardboard. The advertisement device (900) will be discussed below with particular reference to the synthetic panel (901), however, it should be understood that the post card may be substituted for the synthetic panel (901) and therefore may have any or all of the characteristics, properties, components and/or functionalities of the synthetic panel (901), with the exception that the post card is made of a non-synthetic material.

The advertisement (952) may include alphanumeric and/or graphic information, such as names, words, symbols, phrases, terms, a multicolor logo, a design, such as a picture, emblem or logo, and/or other pictures or scenes, etc., including for example, trade names, trademarks, and/or service marks. The advertisement (952) may offer a particular service and/or product for sale (e.g., the delivery service of Acme Delivery), may contain information related to a product, service, and/or the sender, and/or may include personal information of a recipient of the advertisement device (900) and/or a message for the recipient. Additionally, in one embodiment the synthetic panel (901) has a printed pattern on a surface thereof and/or a shape resembling a theme related to a product and/or a service. For example, as shown in FIG. 9 the synthetic panel (901) has a shape and a printed pattern resembling a lion, which represents the fictitious trademark and service theme of Acme Delivery. The advertisement (952) may be applied anywhere on the synthetic panel (901) and/or anywhere on the response panel (950). As shown in FIG. 9, the advertisement (952) is applied to a front side (906) of the synthetic panel (901). The advertisement (952) may be printed directly on a surface of the synthetic panel (901) and/or the response panel (950), using, for example, the specialized printing materials and techniques discussed above. Alternatively, the advertisement (952) is printed on a separate mailing label that is applied to a surface of the synthetic panel (901) and/or the response panel (950).

As discussed above, the synthetic panel (901) is adapted to receive delivery information (903) thereon, such as the name (or "current resident") and address of the recipient and postage where, for example, the United Stated Postal Service is used. Accordingly, the synthetic panel (901) is adapted for direct mail delivery from a sender (e.g., Acme Delivery) to the recipient. Furthermore, and as discussed above, the delivery information (903) may be printed directly on a surface (e.g., the front side (906) or a back side (907)) of the synthetic panel (901), or the delivery information (903) may be printed on a separate mailing label that is applied to a surface (e.g., the front side (906) or the back side (907)) of the synthetic panel (901). The synthetic panel (901) may also include personal information of the recipient and/or a message for the recipient thereon. The personal information and/or message may be applied anywhere on a surface of the synthetic panel (901). For example, as shown in FIG. 9 the synthetic panel (901) includes a message (954) for the recipient on the front side (906). The personal information and/or message may be printed directly on a surface of the synthetic panel (901), or the personal information and/or message may be printed on a separate mailing label that is applied to a surface of the synthetic panel (901). As used herein, "personal information of the recipient" may include any information relating to the recipient, for example information identifying the recipient, such as a name, address, phone number, email address, social security number, etc. As used herein, "messages for the recipient" may include any message the sender desires to communicate to the recipient, for example messages: offering a particular service and/or product for sale (e.g., the delivery service of Acme Delivery); offering a special offer and/or discount; offering a service, product, special offer and/or discount related to and/or specifically tailored to the recipient; instructing the recipient on how to respond to an offer; and/or containing information related to a product, service, and/or the sender. Additionally, in one embodiment the synthetic panel (901) includes contact information (956) for the sender on a surface thereof.

In one embodiment, the response panel (950), similar to the synthetic panel (901), is a panel made of material produced by synthesis, and not of natural origin, such as from synthetic chemical compounds or material. As with the synthetic panel (901), such material includes, but is not limited to, vinyl, styrene, polyester, polyvinyl chloride, plastic, fabric, nylon, Nomex™, Kevlar™, polyethylene terephthalate, polycarbonate, acrylic, Plexiglas™, polypropylene, polyethylene, polystyrene, acrylonitrile-butadiene-styrene terpolymer, polyphenyleneoxidepolystyrene, polyurathane, and polyamides, and blends and combinations thereof. In one implementation, the synthetic material of the response panel (950) is substantially non-porous and adapted for receiving printed ink formulated for printing on synthetic materials as further discussed below. The synthetic material of the response panel (950) is resistant to soiling from dirt, oil, water, and the like; maintains its integrity during: (a) the printing and die cut or molding processes, (b) handling by a direct mail delivery service, and (c) handling by the recipient. Alternatively, the response panel (950) is a panel made of a non-synthetic material, for example paper and/or cardboard.

The response panel (950) includes a first side (958), a second side (960), an edge (962), a thickness sufficient to maintain integrity of the response panel (950), and information (963) responsive to the advertisement (952) on a surface thereof (e.g., the first side (958)). The response panel (950) is preferably of sufficient thickness to maintain integrity of the response panel (950) during direct mail delivery to the recipient with the synthetic panel (901), during handling by the recipient, and during direct mail delivery to the sender. In one embodiment, the response panel (950) has a thickness of between about 0.001 mm to about 10.0 mm. However, it is contemplated that the response panel (950) of the advertisement device could be between about 0.05 mm to about 2.0 mm in thickness or even between about 0.175 mm to about 0.75 mm in thickness, the thickness being essentially a design choice. In one embodiment, the response panel (950) is generally rectangular. The response panel (950) can be flexible or inflexible. The response panel (950) may be opaque, transparent, or translucent. In fact, the response panel (950) can include paper, covered, layered, laminated, coated or embedded with a synthetic material in such a manner as to achieve some or all of the benefits provided by the synthetic materials.

As with the synthetic panel (901), specialized printing materials and techniques may be used to print alphanumeric and graphic information on the response panel (950), for example silk screening printing processes, sheet fed or web offset printing, web letter press printing, gravure printing, or printing utilizing ink jet printing technology. The printing inks may be generally formulated for printing on the synthetic materials (as opposed to paper-type substrates) for enhanced adhesion and practical durability, such that the printing inks may be generally indelible. Additionally, and as with the synthetic panel (901), in one embodiment an anti-microbial agent is added to the synthetic material of the response panel (950), to the ink used to print alphanumeric and graphic information on the response panel (950), and/or to a coating applied upon at least one surface of the response panel (950) to help at least partially inhibit the growth, development or accumulation of undesirable biological agents thereon. Accordingly, in such embodiments the response panel (950) may be more desirable for public use as it is less likely to carry or deliver disease-causing microbes or biological agents to the recipient because the growth, development or accumulation thereof on the device is reduced considerably.

The response panel (950) is also adapted to receive delivery information (964) thereon, such as a name and address of the sender (e.g. Acme Delivery) and postage (966) where, for example, the United Stated Postal Service is used. Additionally, the response panel (950) is generally rectangular and is therefore generally suitable for direct mail delivery without any additional packaging. Accordingly, the response panel (950) is adapted for direct mail delivery from the recipient to the sender. In one embodiment, the postage (966) includes pre-paid postage. The delivery information (964) may be printed directly on a surface (e.g., the first side (958) or the second side (960)) of the response panel (950), or the delivery information (964) may be printed on a separate mailing label that is applied to a surface of the response panel (950). The response panel (950) may also include personal information of the recipient and/or a message for the recipient thereon. The personal information and/or message may be applied anywhere on a surface of the response panel (950). For example, as shown in FIG. 9 the response panel (950) includes personal information (968) of the recipient on the first side (958). The personal information and/or message may be printed directly on a surface of the response panel (950), or the personal information and/or message may be printed on a separate mailing label that is applied to a surface of the response panel (950). Additionally, the response panel (950) may include a section (970) adapted to receive a written and/or typed response from the recipient. Furthermore, in one embodiment the response panel (950) includes contact information (956) for the sender on a surface thereof.

As discussed above, the response panel (950) includes information (963) responsive to the advertisement (952) thereon. The information (963) responsive to the advertisement (952) may be applied anywhere on a surface of the response panel (950). For example, as shown in FIG. 9 the response panel (950) includes information (963) responsive to the advertisement on the first side (958). The information (963) responsive to the advertisement may be printed directly on a surface of the response panel (950), or the information (963) responsive to the advertisement may be printed on a separate mailing label that is applied to a surface of the response panel (950). As used herein, "information responsive to the advertisement" may include any information that communicates a response to the advertisement (952), for example, acceptance or denial of an offer for sale of a particular service and/or product, acceptance or denial of a special offer and/or discount, acceptance or denial of an offer for a service, product, special offer and/or discount related to and/or specifically tailored to the recipient, a request for more information about an offer and/or a particular service and/or product, personal information of the recipient, and/or a section (970) adapted to receive a written and/or typed response from the recipient communicating one or more of the above and/or other information that communicates a response to the advertisement (952). In one embodiment, the information (963) responsive to the advertisement (952) includes a plurality of different responses to the advertisement (952), thereby allowing the recipient to select one or more particular response(s) to the advertisement (952) from the plurality of different responses by indicating on the response panel (950), for example by a written or typed indication, the particular response(s) selected. Additionally, although the advertisement device (900) is herein described and illustrated as having only one response panel (950), it should be understood that the advertisement device (900) may include any number of response panels (950). For example, in an alternative embodiment the advertisement device (900) includes a plurality of response panels (950), wherein the information (963) responsive to the advertisement (952) is different on each response panel (950) to allow the recipient to select one or more particular response(s) to the advertisement by delivering one or more of the response panels (950) to the sender by direct mail delivery.

The response panel (950) is attachable to the synthetic panel (901) in any suitable manner for direct mail delivery to the recipient with the synthetic panel (901), as exemplified in the embodiments shown in FIGS. 11-14 and discussed below. The response panel (950) is also detachable from the synthetic panel (901) by the recipient. Thereafter, the recipient can respond to the advertisement by delivering the detached response panel (950) to the sender using direct mail delivery. The information (963) responsive to the advertisement (952) on the response panel (950) communicates to the sender the recipient's particular response to the advertisement (952), whether the response be a written or typed response from the recipient and/or a response applied to the response panel (950) before direct mail delivery to the recipient with the synthetic panel (901). When the response panel (950) includes personal information (968) of the recipient, the personal information (968) communicates the identity of the recipient to the sender.

When the synthetic panel (901) is irregular-shaped, for example when the synthetic panel (901) has a shape resembling a theme related to a product and/or a service, the advertisement device (900) may require bulk packaging in a regular-shaped package or envelope for direct mail delivery. In particular, in one implementation in which the United States Postal Service does not individually deliver irregular-shaped items directly from a sender to a recipient, each synthetic panel (901) having an irregular shape is delivered via bulk packaging or envelopes in compliance with US Postal Service requirements, where the bulk package or envelope is addressed based on the delivery information (903) of the respective panels (901).

Alternatively, when the synthetic panel (901) is irregular-shaped, for example when the synthetic panel (901) has a shape resembling a theme related to a product and/or a service, the advertisement device (900) may be bundled with a plurality of other copies of device (900) each bearing specific addressing information (903) to be delivered to a post office that conducts local deliveries for the area covering all of the specific addresses (903) printed on the plurality of devices (900). In this implementation, the plurality of devices (900) may be bundled via bulk packaging in a regular-shaped package, such as in a box, for the local post office to open and sort into independent devices (900) for direct mail delivery in accordance with the delivery information (903) of the respective devices (900).

Referring now to FIG. 10, a schematic view of an example of a method of delivering an advertisement device (900) having an irregular-shaped synthetic panel and a generally regular-shaped response panel from a sender to a recipient by direct mail delivery is shown. The method includes printing an advertisement (952) or other information on the irregular-shaped synthetic panel (901), attaching the response panel (950) to the synthetic panel (step 1004), packaging a plurality of the advertisement devices (900) in a single package having a generally regular shape, such as in a box (step 1006), and delivering the regular-shaped package containing the plurality of irregular-shaped advertisement devices to the Unites States Postal Service (step 1008). The United States Postal Service may deliver the regular-shaped package to the Unites States Post Office responsible for delivery to the addresses of the intended recipients of the plurality of irregular-shaped advertisement devices contained within the regular-shaped package (step 1010). Alternatively, the sender may deliver the regular-shaped package directly to the United States Post Office responsible for delivery to the addresses of the intended recipient of the irregular-shaped advertisement devices (900) contained within the regular-shaped package.

The United States Post Office responsible for delivery to the addresses of the intended recipients opens the regular-shaped package containing the irregular-shaped advertisement devices (step 1012) and individually delivers each of the plurality of generally irregular-shaped advertisement devices to a recipient (step 1014). A recipient of one of the irregular-shaped advertisement devices may consider the advertisement on the irregular-shaped synthetic panel (e.g., posting the synthetic panel on the recipient's refrigerator using the mechanism to hold the advertisement device with respect to a surface describe above) (step 1016) and then respond to the advertisement on the irregular-shaped synthetic panel by detaching the regular-shaped response panel from the synthetic panel (step 1018) and mailing the response panel to the sender via direct mail delivery (step 1020), for example standard mail of the United States Postal Service. Because the response panel (950) is generally regular-shaped (e.g., generally rectangular), each response panel (950) of the plurality of advertisement devices (900) can be individually delivered directly from the recipient to the sender.

Although the method is illustrated in FIG. 10 and described herein with regard to the United States Postal Service, it should be understood that the method illustrated in FIG. 10 and described herein may be applicable to any courier or delivery service that does not individually deliver irregular-shaped items directly from a sender to a recipient and/or requires bulk packaging of irregular-shaped items in a regular-shaped package for direct mail delivery to an intended zip code or local area.

Figure 11B:
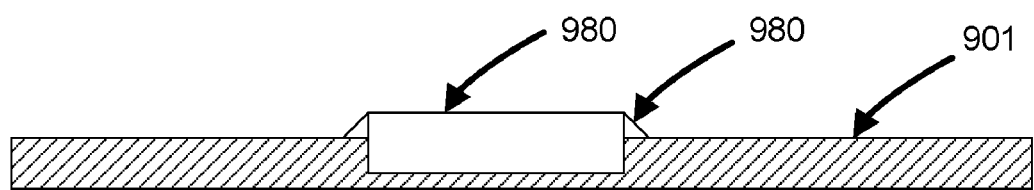
Figure 12A:
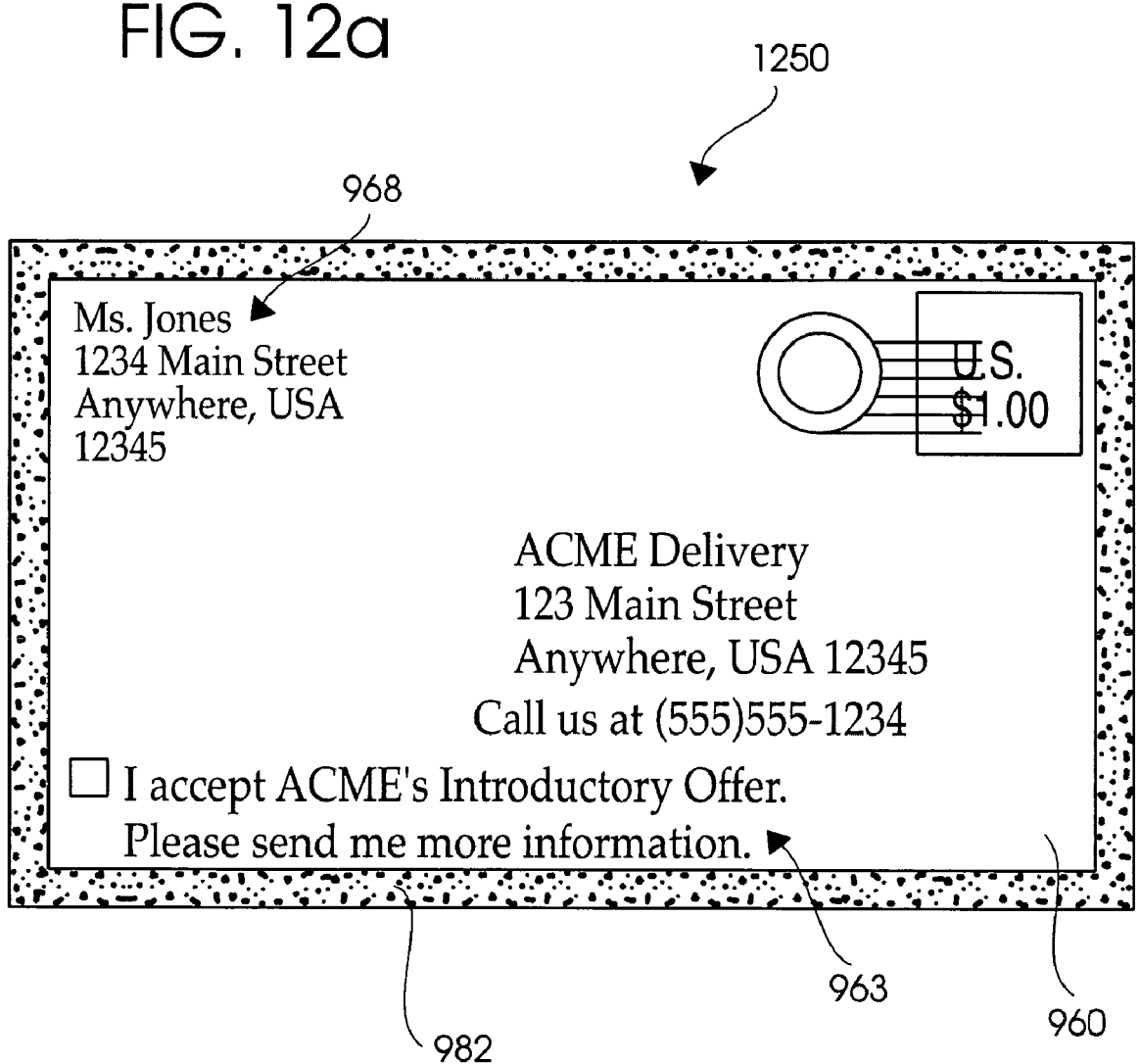
FIG. 12a is a rear view of the overlap of FIG. 12.

Referring to FIGS. 11*a* and 11*b*, a front view of an example of an advertisement device (1100) having an integral response panel (1150), which may be a predefined cutout, is shown. The cutout (1150) is at least partially embedded in the synthetic panel (901) and has a frangible edge (980) delineated by a score or a cut, and information (963) thereon responsive to the advertisement (952) on the synthetic panel (901). The frangible edge (980) attaches the cutout (1150) to the synthetic panel (901), and allows the recipient to detach the cutout (1150) from the synthetic panel for direct mail delivery from the recipient to the sender by breaking and/or cutting the frangible edge (980). The cutout (1150) may be die cut or knife cut, for example, or alternatively may be implemented when the synthetic panel (901) is molded. By embedding the cutout (1150) within the synthetic panel (901), the overall size and weight of the advertisement device (900) can be minimized, while still providing a response panel that may be easily detached from the synthetic panel (901) by the recipient, yet remains attached to the synthetic panel (901) during handling of the advertisement device (900) in the delivery process. However, if the cutout (1150) includes personal information of the recipient and/or a message for the recipient thereon, such personal information and/or message (s) will not be concealed from view during handling of the advertisement device Referring to FIG. 12, a front view of an example of the advertisement device (1200) having a response panel (1250), which may be an overlap, is shown. The overlap (1250) is adapted to cover at least a portion of at least one of the front side (906) and the back side (907) of the synthetic panel (901) when the overlap (1250) is attached to the synthetic panel (901). The overlap (1250) includes information (963) thereon responsive to the advertisement (952) on the synthetic panel (901). The overlap (1250) is attachable to the synthetic panel (901) in any suitable manner such that the overlap (1250) remains attached to the synthetic panel (901) during handling in the delivery process yet is detachable from the synthetic panel (901) by the recipient for direct mail delivery from the recipient to the sender. For example, in one embodiment, shown in FIG. 12*a*, the overlap (1250) is attachable to the synthetic panel using an adhesive (982), whereby the overlap (1250) can be selectively peeled off (detached) from the synthetic panel (901) by the recipient. The adhesive (982) may be applied directly to a surface (e.g., the second side (960)) of the overlap (1250), as shown in FIG. 12*a*, and/or may be applied to a separate material attached to the overlap, for example double-sided tape. In another embodiment, as shown in FIG. 12*b*, the overlap (1250) is attachable to the synthetic panel (901) using a wrapping (984), for example a shrink wrap and/or an overlaminating material, whereby the overlap (1250) can be selectively unwrapped (detached) from the synthetic panel (901) by the recipient. The overlamination, for example, could be with a material, such as a plastic overlaminating film, that serves to hold the overlap (1250) with respect to the synthetic panel (901). Furthermore, as shown in FIG. 12*b*, in one embodiment the wrapping (984) is adapted to receive delivery information (903), such as the name and address of the recipient, and postage (966) where required, thereon for direct mail delivery of the advertisement device (900) from the sender to the recipient. The delivery information (903) and postage (966) may be applied to the wrapping (984) using any suitable method, for example printing the delivery information (903) and/or postage (966) directly on the wrapping and/or printing the delivery information (903) and/or postage (966) on a separate label and attaching the label to the wrapping (984).

In the embodiment of FIG. 12, the synthetic panel (901) may include a message for the recipient thereon, (e.g., the front side (906)), and the overlap (1250) may be adapted to cover the message when the overlap (1250) is attached to the synthetic panel (901) thereby concealing the message from view during handling of the advertisement device (900) in the delivery process. Additionally, as shown in FIG. 12*a*, a surface (e.g., the second side (960)) of the overlap (950) may include personal information (968) of the recipient thereon, and may be adapted to face the synthetic panel (901) when the overlap (1250) is attached to the synthetic panel (901) to conceal the personal information (968) from view during handling of the advertisement device (900) in the delivery process. In another embodiment, as shown in FIG. 12*a*, the surface (e.g., the second side 960)) adapted to face the synthetic panel (901) when the overlap (1250) is attached to the synthetic panel (901) contains some or all of the information (963) responsive to the advertisement (952) thereon, such that the information (963) responsive to the advertisement (952) is concealed from view when the overlap (1250) is attached to the synthetic panel (901). The overlap (1250) illustrated in FIG. 12 not only provides a response panel that may be easily detached from the synthetic panel (901) by the recipient yet remains attached to the synthetic panel (901) during handling of the advertisement device (900), but may also conceal personal information of the recipient and/or a message for the recipient from view during handling of the advertisement device (900) in the delivery process.

The response panel (1250) has a weight and regular shape, such as a rectangular shape, in compliance with US Postal Service requirements such that once the response panel (1150) is detached from the advertisement device (1200), the response panel (1250) may be sent to the United States Postal Service for direct mail delivery back to the sender in accordance with the delivery information (964) on the response panel (1250).

Figure 14:
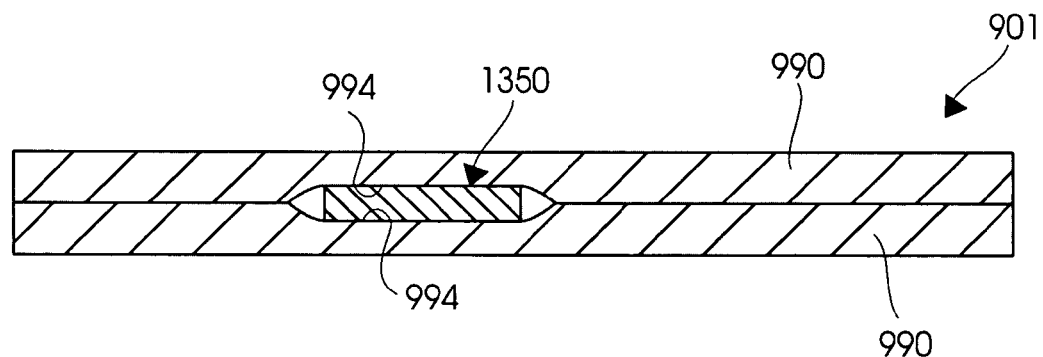
FIG. 14 is a cross-sectional view of the advertisement device of FIG. 13.

Referring to FIG. 13, a front view of another example of the advertisement device (1300) having a response panel (1350) for responding to an advertisement is shown. FIG. 14 is a cross-sectional view of the advertisement device taken along line 14-14 of FIG. 13. In the embodiment illustrated in FIGS. 13 and 14, the synthetic panel (901) has a plurality of layers (990) and the response panel (1350) is at least partially interleaved between two adjacent layers of the plurality of layers (990). The response panel (1350) includes information (963) thereon responsive to the advertisement (952) on the synthetic panel (901). In one embodiment, the response panel (1350) is interleaved between the two adjacent layers of the plurality of layers (990) such that the response panel (1350) is concealed from view during handling of the advertisement device (900) in the delivery process. The two adjacent layers of the plurality of layers (990) may be at least partially separable to allow the recipient to detach the response panel (1350) from the synthetic panel (901) by partially separating the two adjacent layers (990) and removing the response panel (1350) from between the two adjacent layers (990). Additionally, at least one of the two adjacent layers of the plurality of layers (990) may include a frangible edge (992) delineated by a score or a cut to allow the recipient to detach the response panel (1350) from the synthetic panel (901) by breaking the frangible edge (992) and removing the response panel (1350) from between the two adjacent layers of the plurality of layers (990). In one embodiment, the response panel (1350) is formed from a material that will not substantially adhere to the two adjacent layers of the plurality of layers (990).

By interleaving the response panel (1350) between two adjacent layers of the plurality of layers (990) of the synthetic panel (901), any personal information of the recipient and/or any message(s) for the recipient on a surface of the response panel (1350) is concealed from view during handling of the advertisement device (1300) in the delivery process. Additionally, inner surfaces (994) of the two adjacent layers of the plurality of layers (990) that generally face the response panel (950) when the response panel (950) is interleaved between the two adjacent layers (990) may also include personal information of the recipient and/or a message for the recipient thereon. Such personal information and/or message(s) on the inner surfaces (994) of the layers (990) will also be concealed from view during handling of the advertisement device (1300) in the delivery process. In one embodiment, the two adjacent layers of the plurality of layers (990) are completely separable to facilitate access to the personal information and/or messages thereon by the recipient. Accordingly, the advertisement device (1300) illustrated in FIGS. 13 and 14 not only provides a response panel that may be easily detached from the synthetic panel (901) by the recipient, yet remains attached to the synthetic panel (901) during handling of the advertisement device (1300), but may also conceal personal information of the recipient and/or a message for the recipient from view during handling of the advertisement device (1300) in the delivery process.

Referring to FIG. 15, a schematic view of another example of a method (1500) of delivering to a recipient an advertisement device by direct mail delivery is shown. The method of FIG. 15 may include applying an advertisement to a synthetic panel (step 1502), applying information responsive to the advertisement to a response panel (step 1504), applying delivery information to the response panel for direct mail delivery of the response panel from the recipient to the sender (step 1510), attaching the response panel to the synthetic panel such that the response panel is detachable from the synthetic panel (step 1524) by the recipient (step 1516), and delivering the advertisement device to the recipient by direct mail delivery. The method may also include embedding a cutout in the synthetic panel (step 1518), covering a portion of at least one of the front side and the back side of the synthetic panel with an overlap and attaching the overlap to the synthetic panel (step 1520), and/or interleaving the response panel between two adjacent layers of a plurality of layers of the synthetic panel (step 1522). Additionally, the method may also include printing the information responsive to the advertisement on the response panel (step 1506) and/or preprinting the information responsive to the advertisement on a separate label and applying the label to the response panel (step 1508). Furthermore, the method may also include printing the delivery information on the response panel (step 1512) and/or preprinting the delivery information on a separate mailing label and applying the label to the response panel (step 1514).

Referring to FIG. 16, a schematic view of another example of an advertisement device system (1600) for direct mail delivery to a recipient is shown. The advertisement device system (1600) of FIG. 16 includes a synthetic panel having a front side, a back side, (1602) an advertisement on at least one of the front side and the back side (1604), and a thickness sufficient to maintain integrity of the synthetic panel, a response panel for responding to the advertisement (1606), the response panel having information responsive to the advertisement thereon and being adapted to receive delivery information thereon, wherein the response panel is attachable to the synthetic panel for direct mail delivery to the recipient with the synthetic panel, is detachable from the synthetic panel, and is adapted for direct mail delivery from the recipient to the sender. The advertisement device system of FIG. 16 also includes means for applying the information responsive to the advertisement to the response panel, and means for applying the delivery information to the response panel. The means for applying the information responsive to the advertisement to the response panel may include printing the information responsive to the advertisement directly on the response panel using, for example, at least one of silk screening, sheet fed printing, web offset printing, web letter press printing, gravure printing, and ink jet printing, or may include preprinting the information responsive to the advertisement on a separate mailing label and applying the label to the response panel. The means for applying the delivery information to the response panel may include printing the delivery information directly on the response panel using, for example, at least one of silk screening, sheet fed printing, web offset printing, web letter press printing, gravure printing, and ink jet printing, or may include preprinting the delivery information on a separate mailing label and applying the label to the response panel. The advertisement device system may also include means for applying the advertisement to the synthetic panel. The response panel may be a cutout at least partially embedded in the synthetic panel, the cutout having a frangible edge for detachment from the synthetic panel, may be an overlap adapted to cover a portion of at least one of the front side and the back side of the synthetic panel when the overlap is attached to the synthetic panel, and/or may be at least partially interleaved between two adjacent layers of a plurality of layers of the synthetic panel. The advertisement device system may also include means to attach the device to a surface, and/or a mechanism for holding the device with respect to a surface.

As used herein, the term "embedded" refers to a process of molding or carving a graphic or alphanumeric design in a synthetic panel of the advertisement device using techniques known by those skilled in the art, such as by using a die, a knife or a laser cutting tool to cut or score a graphic or alphanumeric design in a synthetic panel. The molding or carving can be on one or both sides of the synthetic panel, and of sufficient depth to allow a recipient to remove the frangible edge that results from the embedding process, and of a depth to maintain the integrity of the cutout during direct mail delivery to a recipient. In addition, as used herein, a response panel that is "at least partially embedded in the synthetic panel" refers to a response panel or cutout that is completely or partially surrounded by the synthetic panel. For example, in one implementation, the response panel or cutout forms a corner of the synthetic panel, where the cutout would be surrounded on two sides by the synthetic panel. In another implementation, the response panel or cutout may be formed or set partially into a surface of the synthetic panel such that the response panel or cutout is partially raised above the surface of the synthetic panel.

As used herein, the term "transparent" when used in reference to a transparent synthetic panel, refers to a synthetic panel that is capable of transmitting light so that objects or images can be seen through the synthetic panel as if there was little or no intervening material. The term transparent synthetic panel as used herein includes a sheet of transparent material, a laminate of transparent materials or an assembly of transparent materials, such as plastic, for example, acrylic sheets or polycarbonate sheets and including other synthetic materials such a polyester film or polyvinyl chloride film and also includes a transparent synthetic panel having an obscure or other distorted image effect.

As used herein, the term "opaque" when used in reference to an opaque synthetic panel, refers to a synthetic panel that is incapable of transmitting significant amounts of light. Opaque material is light absorbing and/or impenetrable to light and is neither transparent nor translucent.

As used herein, the term "translucent" when used in reference to a translucent synthetic panel, refers to a synthetic panel that is capable of transmitting light, but causes sufficient diffusion to prevent perception of distinct images seen through the synthetic panel. The term translucent synthetic panel is intended to include a sheet of translucent material, a laminate of translucent materials such as glass or plastics, for example, acrylic sheets or polycarbonate sheets and includes flexible materials such as polyester film, polyvinyl chloride film, paper, fabric or other material.

As used herein, the term "adhesive" refers to a material that provides or promotes adhesion. Adhesive material that can be used in the present invention include, but is not limited to, glue; paste; cement; and pressure-sensitive adhesive including tackified rubber adhesive, such as natural rubber, olefin, silicone, polyisoprene, polybutadiene, polyurethane, styrene-isoprene-styrene and styrene-butadiene-styrene block copolymers, and other elastomers; and tackified or untackified acrylic adhesives such as copolymers of isooctylacrylate and acrylic acid, which can be polymerized by radiation, solution, suspension, or emulsion techniques; and polymeric binders such as ethylene-vinyl-acetate, ethylene-methyl-acrylate, ethylene-ethyl-acrylate, ethylene-butyl-acrylate, and ethylene-methacrylicacid. The adhesive may be a crosslinked adhesive that gives high shear strength. This cross-linkage may be caused by radiation with or without a chemical cross-linking agent.

Furthermore, in some approaches to this method, in order to improve adhesion of the adhesive layer to a synthetic panel, the synthetic panel can be pretreated prior to applying the adhesive in one or more of the following ways: corona discharge, plasma discharge, flame treatment, electron beam irradiation, ultraviolet radiation, acid etching, or chemical priming. Such pretreatments can be carried out with or without reactive chemical adhesion promoters such as hydroxyethyl acrylate or hydroxyethyl methacrylate, or other reactive species of low molecular weight.

As used herein, the term "pile fastener" refers to fastening tape generally comprising a strip of nylon with a surface of minute hooks that fasten to a corresponding strip with a surface of uncut pile. Velcro™ is the most commonly used pile fastener, and includes for example, Velcro™ matting and Velcro™ loops, and Velcro™ Comp and Velcro™ loops.

Although the invention has been described with respect to specific embodiments and examples, it should be appreciated that other embodiments utilizing the concept of the present invention are possible without departing from the scope of the invention. The present invention is defined by the claimed elements, and any and all modifications, variations, or equivalents that fall within the spirit and scope of the underlying principles.

What is claimed is:

1. An advertisement device for direct mail delivery from a sender to a recipient, the advertisement device comprising:
   a synthetic panel having a front side, a back side, an advertisement on at least one of the front side and the back side, and a thickness sufficient to maintain integrity of the synthetic panel; and
   a response panel physically associated with and detachable from the synthetic panel, the response panel being adapted for direct mail delivery from the recipient to the sender,
   wherein the response panel is a cutout partially embedded in the synthetic panel as the synthetic panel is molded such that the cutout is partially raised above a surface of the synthetic panel, the cutout having a frangible edge for detachment from the synthetic panel.

2. An advertisement device in accordance with claim 1 wherein the response panel includes a section adapted to receive at least one of a written and a typed response from the recipient.

3. An advertisement device in accordance with claim 1 wherein the response panel includes a synthetic material of at least one of vinyl, styrene, polyester, polyvinyl chloride, plastic, fabric, nylon, polyethylene terephthalate, polycarbonate, acrylic, polypropylene, polyethylene, polystyrene, acrylonitrile-butadiene-styrene terpolymer, polyphenyleneoxide-polystyrene, polyurathane, and polymides, and blends and combinations thereof.

4. An advertisement device in accordance with claim 1 wherein the response panel comprises an indelible ink formulated for printing on synthetic materials printed thereon.

5. An advertisement device in accordance with claim 1, wherein the synthetic panel is substantially non-rectangular and comprises a theme related to at least one of a product and a service.

6. An advertisement device in accordance with claim 5, wherein the theme is printed on the synthetic panel in an indelible ink formulated for printing on synthetic materials.

7. An advertisement device in accordance with claim 1, wherein:
   the response panel is one of a plurality of response panels each physically associated with and detachable from the synthetic panel; each of response panels being adapted for direct mail delivery from the recipient to the sender; and
   each of the response panels has different information responsive to the advertisement such that the recipient is able to select and return to the sender one or more of the response panels.

* * * * *